United States Patent [19]

Rich

[11] Patent Number: 4,973,485
[45] Date of Patent: Nov. 27, 1990

[54] ORANGE STRIPPER ESSENCE AND STRIPPER OIL HAVING HIGH RATIOS OF MORE DESIRABLE TO LESS DESIRABLE FLAVOR COMPOUNDS

[75] Inventor: Thomas F. Rich, Cincinnati, Ohio

[73] Assignee: The Procter & Gamble Company, Cincinnati, Ohio

[21] Appl. No.: 409,976

[22] Filed: Sep. 18, 1989

Related U.S. Application Data

[63] Continuation of Ser. No. 316,567, Feb. 24, 1989, abandoned, which is a continuation of Ser. No. 51,878, May 18, 1987, abandoned.

[51] Int. Cl.$^5$ ............................................. A23L 1/222
[52] U.S. Cl. .................................... 426/534; 426/387; 426/651
[58] Field of Search ............... 426/599, 384, 534, 616, 426/386, 387, 650, 651, 590

[56] References Cited

U.S. PATENT DOCUMENTS

| | | | |
|---|---|---|---|
| 4,374,865 | 2/1983 | Strobel | 426/495 |
| 4,463,025 | 7/1984 | Strobel | 426/495 |
| 4,647,466 | 3/1987 | Japikse | 426/387 |
| 4,693,905 | 9/1987 | Japikse | 426/599 |

OTHER PUBLICATIONS

Matthews et al., 1987, Recovery and Applications of Essential Oils from oranges Food Technology, 41(1) 57.
Moshones et al. 1986, Quantities of Volatile Flavor Components in Aqueous Orange Essence and in Fresh Orange Juice Food Technology, 40(11) 100.

*Primary Examiner*—Carolyn Paden
*Attorney, Agent, or Firm*—Eric W. Guttag; Gary M. Sutter; Richard C. Witte

[57] ABSTRACT

Aqueous orange stripper essences and orange stripper oils are disclosed which have high ratios of more desirable to less desirable orange flavor compounds. For the stripper essences, this ratio is from about 10:1 to about 300:1 and is based on the combined amount of ethyl acetate, ethyl butyrate and acetaldehyde, relative to the combined amount of hexanal and alpha-terpineol. For the stripper oils, this ratio is from about 0.5:1 to about 15:1 and is based on the amount of valencene, relative to the combined amount of alpha-pinene, myrcene, octanal, decanal and linalool.

12 Claims, 1 Drawing Sheet

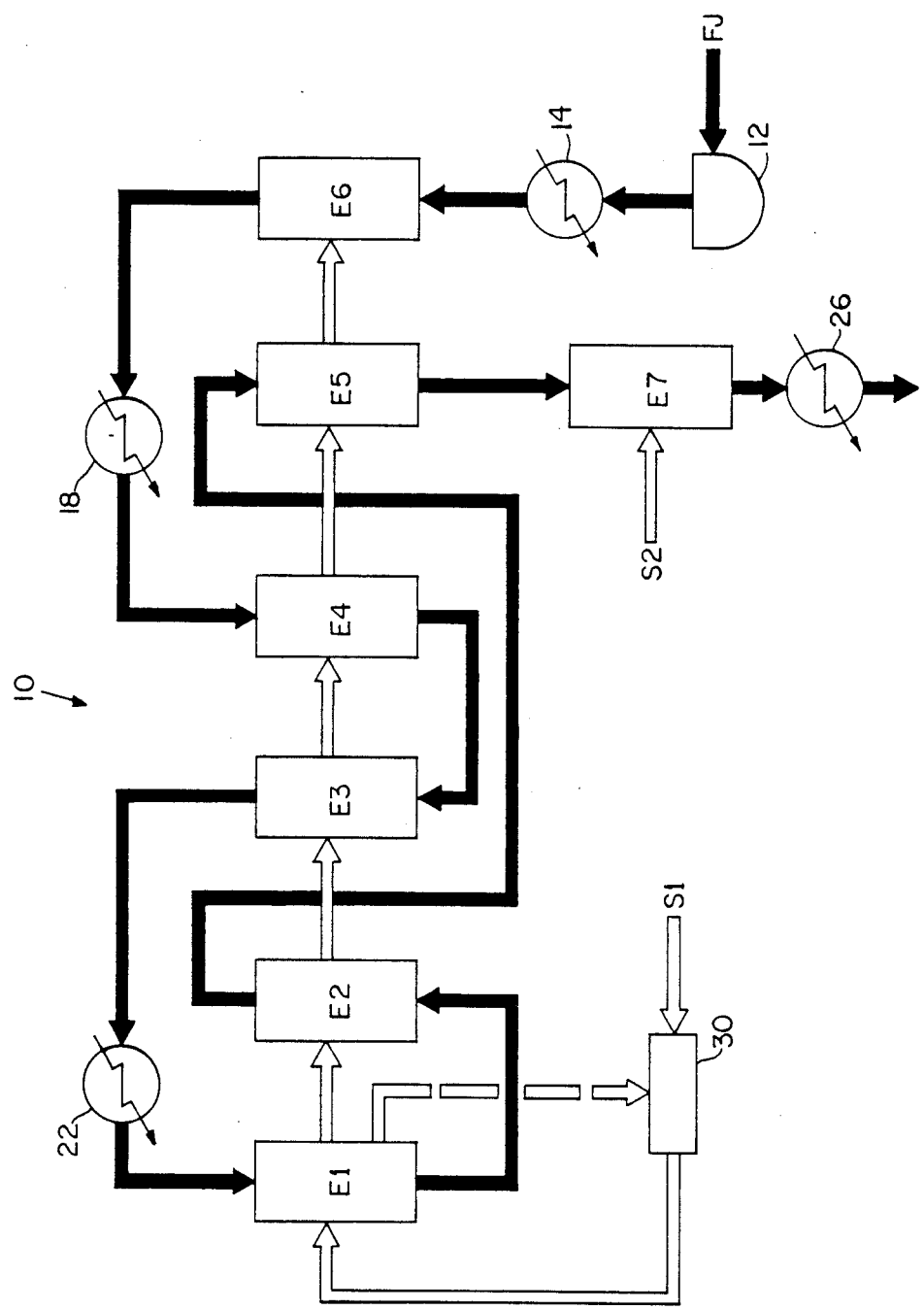

ORANGE STRIPPER ESSENCE AND STRIPPER OIL HAVING HIGH RATIOS OF MORE DESIRABLE TO LESS DESIRABLE FLAVOR COMPOUNDS

This application is a continuation of Ser. No. 316,567, filed Feb. 24, 1989, which is now abandoned, which is a continuation of Ser. No. 051, 878, filed May 18, 1987 which is now abandoned.

TECHNICAL FIELD

This application relates to commercially processed orange juice products which are closer to hand-squeezed orange juice in character than current commercial products. This application particularly relates to an orange stripper essence and stripper oil useful in preparing such products.

For many people, the "gold standard" of orange juice beverages is freshly hand-squeezed orange juice. Hand-squeezed orange juice has many properties which are desirable to the consumer. These properties include the color and hue of the juice, its foaming characteristics, and the appearance of floating, intact juice sacs. In addition, hand-squeezed orange juice has a particularly pleasing, fruity aroma and flavor character.

Hand-squeezed orange juice also has unique textural characteristics. Somewhat surprisingly, hand-squeezed juice exhibits pseudo plastic behavior, i.e. is "shear-thinning." This pseudo plastic behavior is especially apparent at shears associated with sipping and swallowing of orange juice. For example, hand-squeezed juice from Florida Valencia oranges has a relatively low average viscosity of from 4 to 6 centipoise (measured at 8° C.) at shear rates of 10 to 100 sec$^{-1}$ which approximate the shear of sipping and swallowing.

This unique drinking texture of orange juice is believed to be controlled by at least two different factors. One is the amount of background or "sinking" pulp present in hand-squeezed juice. This sinking pulp, while fairly small in size (i.e., passes through a 20 mesh screen), influences significantly the viscosity of orange juice. The other is the relatively low levels of pectin and hesperidin, the major flavanoid glycoside present in the pulp, peel and rag. The cloud in orange juice contains an assemblage of needle-like hesperidin crystals stuck together with pectin. It is believed that this assemblage of hesperidin and pectin influences, to a lesser extent than sinking pulp, the viscosity of orange juice.

The unique properties ad characteristics of hand-squeezed orange juice result, in large part, from how it is made. Hand-squeezing involves fairly gentle extraction of juice from the orange fruit. This gentle extraction minimizes the introduction of off-flavor compounds, as well as materials which adversely affect color and texture. In particular, hand-squeezing prevents the introduction of significant levels of peel oil and other off-flavors which can impart a bitter flavor character to the juice. Hand-squeezing also minimizes the grinding of juice sacs into viscosity-increasing sinking pulp. There is also typically less abrasion of the rag and albedo portion of the peel which contain off-flavor components, as well as hesperidin glycosides and soluble pectin.

Hand-squeezing oranges is not a practical way to generate commercial quantities of orange juice. The yield of juice from orange fruit by using hand squeezers is fairly low, typically on the order of about 80–90%. Even if commercial quantities of juice could be extracted by hand-squeezing, it would not be economical to distribute it in that form. Hand-squeezed orange juice contains about 85 to about 90% water. The most economical way to store and distribute orange juice is in concentrated form. Indeed, the bulk of orange juice commercially processed in the U.S. exists in concentrate form.

Another factor which would make distribution of hand-squeezed orange juice impractical is its lack of storage stability. Hand-squeezed juice contains pectinesterase enzymes which can demethoxylate pectins present in the juice. These demethoxylated pectins can form undesirable jellified lumps over time which increase the viscosity of the juice. In addition, because hand-squeezed juice has a relatively high water activity, it is subject to microbial spoilage in a relatively short time period unless pasteurized.

Commercially processed orange juice products have tried to approach the quality of hand-squeezed orange juice. These attempts have not been completely successful. The lack of hand-squeezed character in commercially processed juice products is due in large part to the quality of the starting feed juice. Current commercial fed juices contain significant levels of undesirable components or contaminants which are very difficult, or impossible, to remove during subsequent juice processing.

In commercial operations, the quality of the starting feed juice is determined by essentially two factors. One is the quality of the fruit which is used. The use of over-ripe, immature or very small fruit can contribute undesirable flavor compounds and contaminants to the feed juice. The other, more significant factor is the equipment used in juice extraction and finishing, in particular the conditions under which this equipment is operated. Operating conditions usually involve a compromise between quality of the juice and the yield of juice from the orange fruit. Generally, the higher the quality of the feed juice, the lower will be the yield, and vice versa. Accordingly, targeting a feed juice to have the characteristics of hand-squeezed orange juice is not an easy choice, given the potential adverse economics of a low juice yield.

Even if the feed juice approaches hand-squeezed quality, further commercial processing can adversely affect its properties. The characteristic "fresh" compounds of freshly hand-squeezed orange juice include the low molecular weight alcohols (e.g., ethanol and methanol), aldehydes (e.g., acetaldehyde) and esters (e.g., ethyl butyrate and ethyl 3-hydroxyhexanoate). Since these compounds are relatively volatile, they can be easily lost due to volatilization. In addition, these delicate compounds, as well as other less volatile compounds such as valencene are easily degraded during evaporative heat concentration processes typically used to remove the bulk of water from the feed juice.

One method for preserving these delicate aroma and flavor volatiles is to strip them from the feed juice before evaporative concentration. One such process is disclosed in European patent application 110,638 to Powers et al, published June 13, 1984. In the Powers et al process, the feed juice is stripped with steam or inert gas to remove orange aroma/flavor volatiles. These striped volatiles are then condensed at progressively colder temperatures preferably in the range of 95° to −50° F. The resulting aroma/flavor condensate is separated by centrifugation to provide an aqueous stripper essence and a stripper oil. The stripper essence and stripper oil are subsequently added back to the concentrated stripped juice.

The Powers et al process is basically preservative in nature. This means that whatever volatiles are stripped out of the feed juice will be essentially present in the stripper essence or stripper oil. This includes off-flavor volatile components as well. Accordingly, the quality of the feed juice can determine greatly the quality of the resulting stripper essence and stripper oil obtained by the Powers et al process.

After the delicate aroma and flavor volatiles have been removed from the feed juice, it is then concentrated. Most commercial concentration processes utilize heat evaporation techniques to remove the bulk of water from the juice. In addition to removing water, these evaporative processes also serve additional functions. One important function is to deactivate enzymes present in the juice, in particular pectinesterase.

The standard evaporative system for concentrating feed juice utilizes temperature accelerated short-time evaporators (TASTE). TASTE evaporators concentrate by heating a flowing film of the feed juice with steam or vapor previously generated from the feed juice. In a standard seven-stage, four-effect TASTE evaporator system, the fed juice is heated at progressively higher temperatures, starting at 40° C., and passing through a maximum evaporative temperature of 96° C., followed by heating at progressively lower temperatures ending at 40° C. where the concentrated juice attains a solids level of 63° Brix. See Nagy et al, Citrus Science and Technology, Vol. 2 (1977), pp. 217-218.

TASTE evaporative systems can impart cooked off-flavors to the resulting concentrated orange juice. This due to a combination of relatively long times (minutes) to which the juice is subjected to relatively high temperatures, e.g. as high as 96° C. TASTE concentrates (58° to 72° Brix) derived from current commercial Florida feed juices can also have viscosities of from about 8,000 to about 20,000 centipoise at 8° C. Even when these TASTE concentrates are diluted to single strength, they have viscosities much higher than that of hand-squeezed orange juice.

BACKGROUND ART

European Patent Application 110,638 to Powers et al, published June 13, 1984, discloses a process for obtaining aqueous stripper essences and stripper oils. In the Powers et al process, a feed juice obtained from conventional juice extractors and finishers is stripped with steam to remove orange aroma/flavor volatiles. These stripped volatiles are then condensed at progressively colder temperatures typically in the range of 95° to −50° F. in three condensers cooled, respectively, by cooling tower water, glycol and ammonia. The resulting aromas/flavor condensate contains an aqueous phase and an oil phase. The aqueous phase is separated by centrifugation and then concentrated to obtain the aqueous stripper essence. The separated oil phase forms the stripper oil.

U.S. Pat. No. 2,641,550 to Dykstra, issued June 9, 1953, describes a process for removing aroma and flavor materials from fruit juices, in particular orange juice. In the Dykstra et al process, the aroma/flavor volatiles can be stripped from the juice by using an inert gas. The stripped volatiles are then preferably condensed in three stages: (1) at 32° to 85° F. using tap water; (2) between 32° and −95° F. using brine; and (3) below −130° F. using liquid nitrogen. The condensate obtained from the first stage, which is characterized as being entirely water without detectable flavor materials, is discarded. The condensate from the second and third stages is ultimately added back to the concentrated juice.

U.S. Pat. No. 3,248,233 to Brent et al, issued Apr. 26, 1966, discloses a process for recovering essence from orange or other fruit juice which is subsequently added back after concentration. In the Brent et al process, the juice is flash evaporated to obtain the essence. This stripped essence is then sent to a vacuum pump where the volatile components become entrained within the water or other liquid forming the seal in the pump. The liquid stream containing the entrained volatiles is then added back to the concentrated juice.

U.S. Pat. No. 2,573,699 to eskew et al, issued Nov. 6, 1951, discloses a process for preparing frozen juice concentrates. In the Eskew et al process, volatile aroma components are first stripped from the fresh juice. The stripped components are concentrated by fractional distillation to form an essence. The stripped juice is concentrated under vacuum and then the essence is added back.

DISCLOSURE OF THE INVENTION

The present invention relates to an aqueous orange stripper essence having high ratios of more desirable to less desirable orange flavor compounds. This orange essence comprises:
 (a) from about 0.5 to about 8% ethanol;
 (b) ethyl acetate ethyl butyrate and butyrate and acetaldehyde in a combined amount of from about 100 to about 300 parts, per 10,000 parts ethanol;
 (c) hexanal and alpha-terpineol in a combined amount of from about 1 to about 10 parts, per 10,000 parts ethanol;
 (d) a ratio of component (b) a to component (c) of from about 10:1 to about 300:1.

The present invention further relates to an orange stripper oil having a high ratio of valence to less desirable orange flavor compounds. This orange oil comprises:
 (a) from about 60 to about 95% limonene;
 (b) from about 1 to about 15 parts valencene, per 100 parts limonene;
 (c) alpha-pinene, myrcene, octanal, decanal and linalool in a combined amount of from about 1 to about 6 parts, per 100 parts limonene;
 (d) a ratio of valencene to component (c) of from about 0.5:1 to about 15:1.

BRIEF DESCRIPTION OF DRAWING

The Figure shows schematically a preferred evaporative concentration system used with the present invention.

A. Obtaining Feed Juice from Orange Fruit

A key aspect of he present invention is the starting feed juices obtained from orange fruit. The physical and chemical composition of these feed juices is unique, especially compared to current commercial feed juices. However, the textural, aroma and flavor properties of these unique feed juices are such that they are more like hand-squeezed orange juice. Surprisingly, preferred feed juices of the present invention (titratable peel oil content of about 0.010% or less) have been found to be equally preferred to hand-squeezed juice, when obtained from the same variety of orange fruit (e.g. Valencia orange fruit). By comparison, current commercial feed juices have ben found to be significantly dispreferred relative to hand-squeezed juice.

These "more like hand-squeezed orange juice" characteristics are important to the textural, aroma and flavor properties of orange juice products prepared from the unique feed juices of the present invention. In addition, the particular physical and chemical composition of these unique fed juices is highly important to subsequent processing, including aroma and flavor volatile striping and evaporative concentration. Surprisingly, these high quality feed juices can be obtained at commercially acceptable juice yields (at least about 90%) when using the feed juice processing techniques to be described hereafter. This is contrary to current belief in the orange juice industry that high quality feed juice can only be obtained at such lower juice yields and vice versa.

The unique feed juices of the present invention can be obtained from either Valencia orange fruit or non-Valencia orange fruit. As used herein, "Valencia orange fruit" refers to orange fruit from the genotype or variety Valencia which usually mature late in the respective harvest season and typically have a relatively high peel oil content. Examples of suitable Valencia fruit include Florida Valencia fruit, California Valencia fruit and Brazilian Valencia fruit. Juice extracted from Valencia fruit, especially Florida Valencia, tends to have a strong "fresh" aroma/flavor character and thinner, less pulpy texture.

As used herein, "non-Valencia orange fruit" refers to all remaining orange fruit which usually matures in the early to middle part of the harvest season and typically has a relatively low peel oil content. Examples of suitable non-Valencia fruit include the Florida Early/Mid season oranges (Hamlin, Parson Brown and Pineapple), Brazilian varieties such as Pera Rio and Natal, as well as tangerines, mandarin oranges, blood oranges and navel oranges. Juice extracted from non-Valencia orange fruit tends to have a less strong "fresh" aroma/flavor character and a thicker, more pulpy texture compared to that extracted from Valencia fruit.

An important characteristic of the feed juices of the present invention is their viscosity. Selection of the "right" viscosity for the feed juice has been found to be particularly critical to achieving a "more like had-squeezed juice" texture for the ultimate orange juice product. For example, orange juice products prepared from feed juices having too low a viscosity will be characterized as "watery" or "thin" in texture. By comparison, current, higher viscosity, commercial feed juices lead to orange juice products having a "thicker" mouth feel unlike that of hand-squeezed orange juice. In addition, it has been found that feed juice viscosity has important effects on juice yield and subsequent evaporative concentration of the feed juice. For example, a feed juice having too low a viscosity usually means an unacceptable loss of juice yield. By contrast, a feed juice having too high a viscosity can make it extremely difficult, or impossible, to evaporatively concentrate the feed juice and can cause excessive generation of cooked off-flavor.

For these reasons, feed juices of the present invention have relatively low viscosities. The particular viscosity of the feed juice (when measured at 8° C.) depends on the orange fruit from which it is derived. Generally, feed juices of the present invention obtained from non-Valencia fruit have lower viscosities than those obtained from Valencia fruit. For feed juices obtained from non-Valencia fruit, the viscosity is about 8 centipoise or less. Typically, non-Valencia feed juices have a viscosity of from about 5 to about 8 centipoise, preferably from about 6 to about 7 centipoise. For feed juices obtained from Valencia fruit, the viscosity is about 10 centipoise or less. Typically, Valencia feed juices have a viscosity of from about 7 to about 10 centipoise, preferably from about 8 to about 9 centipoise. Feed juices having these viscosities for the indicated orange fruit permit the preparation of orange juice products having textural properties more like hand-squeezed juice without significantly affecting juice yield or the ability to effectively concentrate the feed juice by the evaporative process described hereafter in part C of this application. (The method for measuring the viscosity of feed juices of the present invention is described hereafter in part E of this application.)

Another key characteristic of feed juices of the present invention is their level of sinking pulp. As used herein, "sinking pulp" refers to insoluble materials present in the juice which have a particle size less than about 0.5 mm. Sinking pulp usually results from the shredding or cutting of juice sacs into much finer particles. The level of sinking pulp has a particularly important effect on the viscosity of the feed juice. Generally, as the level of sinking pulp increases, the viscosity of the feed juice likewise increases. In addition, the level of sinking pulp can be an indicator of how gently the feed juice was extracted and finished. Generally, the more gentle the extraction an finishing steps, the lower the level of the sinking pulp. Other factors affecting the level of sinking pulp include the condition of the fruit (especially freeze damage) and its physical handling prior to extraction.

The level of sinking pulp is desirably minimized in feed juices of the present invention. The particular sinking pulp level of the feed juice depends on the orange fruit from which it is derived. Generally, feed juices of the present invention obtained from non-Valencia fruit have less sinking pulp than those obtained from Valencia fruit. For feed juices obtained from non-Valencia fruit, the level of sinking pulp is about 8% or less. Typically, non-Valencia feed juices have a sinking pulp level of from about 5 to about 8%, preferably from about 6 to about 7%. For feed juices obtained from Valencia fruit, the level of sinking pulp is about 10% or less. Typically, Valencia feed juices have a sinking pulp level of from about 7 to about 10%, preferably from about 8 to about 9%. (The method for measuring the sinking pulp level of feed juices of the present invention is described hereafter in part E of this application.)

Another important characteristic of feed juices of the present invention is their level of titratable peel oil. The level of peel oil can be an important indicator of how carefully the juice was extracted from the orange fruit, especially fruit which has not been deoiled. Generally, the lower the level of peel oil (and other peel contaminants) present in the feed juice, the more gentle is the extraction of the juice from the orange fruit.

It is desirable in the feed juices of the present invention to minimize the level of titratable peel oil. The level of titratable peel oil in these feed juices is about 0.015% or less, preferably about 0.010% or less. The particular level of titratable peel oil in these feed juices often depends on the fruit from which it is derived. Generally, feed juices from non-Valencia fruit can be more easily processed to have lower levels of titratable peel oil than those obtained from Valencia fruit. For non-Valencia feed juices, the level of titratable peel oil typically ranges from about 0.004 to about 0.010%. For Valencia juices, thelevel of titratable peel oil typically ranges from about 0.006 to about 0.015%. By comparison, current commercial feed juices typically have titratable peel oil contents of from about 0.020 to about 0.045%. (The method for measuring the titratable peel oil content of feed juices of the present invention is described hereafter in part E of this application.)

The level of peel oil present in the feed juice can greatly affect its orange aroma and flavor composition, as well as that of the resulting orange juice product. The orange flavor compounds present in peel oil tend to be bitter or burning in character. During subsequent stripping of the feed juice to remove and recover orange aroma and flavor volatiles prior to evaporative concentration, these bitter/burning flavor compounds can be removed and recovered as well. Since the stripped volatiles are subsequently added back to the concentrated juice, this can result in undesirable bitter/burning flavor characteristic in the orange juice product if the level of peel oil in the feed juice is too high. In addition, peel oil comprises predominantly terpene (or terpene-like) compounds which can be oxidized or thermally degraded to less desirable orange flavor compounds. High levels of peel oil can also adversely affect the partitioning of desirable water-soluble orange flavor compounds into the oil phase.

The importance of minimized peel oil content on the orange aroma and flavor quality of feed juices is particularly shown by a ratio based on the level of more desirable orange compounds, relative to the level of less desirable orange compounds. For the purposes of the feed juices of the present invention, the level of more desirable orange compounds is based on the combined amount of acetaldehyde, methanol, ethyl butyrate, ethyl 3-hydroxyhexanoate and valencene. Acetaldehyde, methanol, ethyl butyrate and ethyl 3-hydroxyhexanoate are highly volatile compounds which contribute to the "freshness" of the feed juice. Valencene is a less volatile compound which contributes desirable "orangey" flavor character to the feed juice.

For the purposes of the feed juices of the present invention, the level of less desirable orange compounds is based on the combined amount of hexanal, alpha-pinene, myrcene, decanal, linalool, and octanal. These less desirable compounds represent components obtained from the peel portion of the fruit, as well as undesirable degradation products. Except for hexanal, these compounds are generally less volatile than water.

In addition to affect variety (non-Valencia versus Valencia fruit) and juice processing conditions, seasonal and yearly variations in fruit lots can affect the ratio of more desirable to less desirable orange compounds for a given feed juice. Even so, it has been found, on average, that feed juices of the present invention have a higher ratio of more desirable orange compounds to less desirable orange compounds when compared to current commercial feed juices for a given variety of fruit. Conversely, it has also been found that this ratio, on average, is lower than that of hand-squeezed juice for a given variety of fruit. In addition, it has been surprisingly found that, as the level of titratable peel oil in feed juices of the present invention is decrease (e.g., from 0.015% to 0.010%), the change in chemical composition (especially the ratio of more to less desirable compounds) is far greater than would be expected from the decreased peel oil level.

The differences in the ratio of more to less desirable compounds (averaged over two fruit seasons±standard deviation) between feed juices of the present invention containing moderate titratable peel oil levels (Moderate Oil) and preferred low titratable peel oil levels (Low Oil), and hand-squeezed juice (HSJ) and current commercial feed juices (Current), are particularly shown in the following Tables:

| | Florida Early/Midseason Fruit | | | |
|---|---|---|---|---|
| | HSJ | Low Oil | Moderate Oil | Current |
| Peel Oil(%)* | 0.0061 ±.0027 (n = 18) | 0.0098 ±.0015 (n = 62) | 0.0147 ±.0012 (n = 53) | 0.0228 ±.0058 (n = 44) |
| Ratio* | 33.79 ±17.45 (n = 18) | 18.07 ±9.57 (n = 62) | 12.66 ±5.15 (n = 53) | 7.00 ±4.66 (n = 52) |

*average based on completely finished juices

| | Florida Valencia Fruit | | | |
|---|---|---|---|---|
| | HSJ | Low Oil | Moderate Oil | Current |
| Peel Oil(%)* | 0.0044 ±0.0014 (n = 66) | 0.0106 ±.0013 (n = 116) | 0.0137 ±.0010 (n = 36) | 0.0332 ±.0065 (n = 45) |
| Ratio* | 49.10 ±19.72 (n = 67) | 18.48 ±7.68 (n = 116) | 12.63 ±4.70 (n = 36) | 5.44 ±2.13 (n = 45) |

*average based on completely finished juices

Certain Valencia feed juices of the present invention with ratios of more desirable to less desirable orange compounds of from about 8.5 to about 21.5 have been found to be especially preferred. These preferred Valencia feed juices have been found, in flavor paneling of the completely finished juice, to be equally preferred to certain hand-squeezed Valencia juice with ratios of from about 18 to about 52. These preferred Valencia feed juices have also been found, in flavor paneling of the completely finished juice, generally to be significantly preferred over current commercial valencia feed juices with ratios of from about 3 to about 7. (it is also expected that non-Valencia feed juices of the present invention with ratios of more desirable to less desirable orange compounds of from about 8.5 to about 21.5 would provide similar results.)

(The method used to measure the level of ethanol, methanol, acetaldehyde, ethyl butyrate and hexanal in feed juices of the present invention is the purge and trap analytical method described hereafter in part E of this application. The method used to measure the level of the remaining orange compounds in feed juices of the present invention is the tissue homogenization analytical method described hereafter in part E of this application.)

Another important characteristic of the feed juices of the present invention is their level of flavanoid glycosides. The most predominant example of these glycosides is hesperidin. Hesperidin is present at significant levels in both the rag and the albedo portion of the peel, and at especially high levels in the pulp. Accordingly, the level of flavanoid glycosides present in the feed juice can be an indicator of how gentle was the extraction of the orange fruit and the finishing of the resulting juice. Generally, the more gentle the extraction and finishing, the lower will be the level of flavanoid glycosides in the feed juice. In addition to indicating the gentleness of extraction and finishing, the level of these flavanoid glycosides can affect the viscosity of the feed juice. Generally, the lower the level of these glycosides, the lower will be the viscosity of the feed juice (i.e., tends to parallel level of sinking pulp). Besides affecting the viscosity of the feed juice (and resulting orange juice product), high levels of these glycosides can cause fouling of evaporators used in the subsequent concentration step, leading to development of cooked off-flavor.

For feed juices of the present invention, it is desirable to minimize the level of flavanoid glycosides. The particular level of glycosides in these feed juices depends on the fruit from which it is derived. Generally, feed juices obtained from non-Valencia fruit have higher levels of glycosides than those obtained from Valencia fruit. For non-Valencia feed juices, the level of these glycosides is about 200 mg. or less per 100 ml., with a typical range of from about 125 to about 200 mg. per 100 ml. For Valencia feed juices, the level of these glycosides is about 175 mg. or less per 100 ml., with a typical range of from about 100 to about 175 mg. per 100 ml. (The method for measuring the level of flavanoid glycosides in feed juices of the present invention is described hereafter in part E of this application.)

The unique feed juices of the present invention are obtained by a combination of careful fruit selection and processing conditions. The firs step is to select processable orange fruit. As used herein, the ferm "processable orange fruit" refers to fruit which can be processed with commercial juice extraction and finishing equipment to provide feed juices having a ratio of Brix solids to titratable acidity (TA) of from about 12 to about 20, preferably from about 14 to about 18. For example, soft, rotten or immature fruit are preferably removed to prevent the introduction of undesired contaminants into the feed juice. In addition, the selected fruit is preferably processed into feed juice within about 48 hours of being harvested. This minimizes the development of off-flavor compounds in the fruit which occurs over time, especially as the result of abuse and damage during storage.

The selected fruit is gently extracted in a commercial juice extractor to provide extracted juice having about 0.015% or less titratable peel oil, preferably about 0.010% or less titratable peel oil. The term "gently extracted" refers to an extraction method which minimizes the level of peel oil in the extracted juice. Gentle extraction methods also minimize the abrasion of rag and albedo portions of the peel which contain flavanoid glycosides. Further, gentle extraction methods typically avoid significant shredding and cutting of the juice sacs which can add significant levels of sinking pulp to the extracted juice.

The term "commercial juice extractor" refers to a mechanical juice extractor which is capable of processing at least 200 orange fruit per minute. There are three general types of commercial juice extractors. One is referred to as a "reamer-type" juice extractor. In reamer-type juice extractors, fruit entering the machine is sliced in half. The two halves go to opposite sides of the machine. The halves are oriented, picked up by cups, and then positioned across serrated reamers revolving on a synchronized carrier, on a slightly inclined plane. As the fruit progresses around the extractor turntable, the inclined plane causes the rotating reamers to exert increasing pressure on the halved fruit and thus express the juice. See Nagy et al, *Citrus Science and Technology*, Vol. 2, (1977), p. 192-95. Examples of suitable reamer-type juice extractors include the Brown Model 400 (up to 350 fruit per minute),the Brown Model 700 (up to 700 fruit per minute), and the Bertuzzi Model R-16 (up to 400 fruit per minute). See also U.S. Pat. No. 3,858,500 to Rohm et al, issued Jan. 7, 1975, and U.S. Pat. No. 4,421,021 to Holbrook, issued Dec. 20, 1983, for other examples of reamer-type juice extractors.

The second type of juice extractor used in the citrus industry is referred to as a "rotating disc-type." In a rotating disc-type juice extractor, each fruit becomes wedged between pairs of revolving, tapered, circular rubber discs. The discs carry the fruit through a steel knnife which slices the fruit in half. Each half travels a converging path between a perforated steel grid and one of the rotating discs, thus causing juice to be extracted. (The grind provides a coarse primary finishing of the juice simultaneous with extraction.) The extracted juice flows to the bottom of a collector where it can be divided into a low peel oil/pulp fraction from the earlier, lighter pressure stage of extraction and a high peel oil/pulp fraction from the later, greater pressure stage of extraction. See Nagy et al, supra, pp. 194-95. Suitable rotating disc-type juice extractors include the Brown MOdel 1100. See also U.S. Pat. No. 3,245,339 to Leslie et al. issued Apr. 12, 1966, and U.S. Pat. No. 4,170,935 to Rohm et al, issued Oct. 16, 1979, for other examples of rotating disc-type extractors.

The third type of juice extractor used in the citrus industry is referred to as a "reciprocating cup-type." In a reciprocating cup-type extractor, each fruit is deposited in a lower cup. The upper cup then descends which causes the sharp upper end of a round steel tube to cut a circular hole in the bottom of the fruit. As the plurality of fingers of the upper and lower cups mesh, the expressed juice-laden segments pass into the tube through the hole cut in the fruit. The lower end of the tube has a restrictor to prevent the loss of juice and to force the juice through perforations in the side of the tube. Seeds, rag, peel and large pulp particles remain inside the tube. See Nagy et al, supra, pp. 190-191. Examples of suitable reciprocating cup-type juice extractors include the FMC Model 291, the FMC Model 391, the FMC Model 491 ad the FMC Model Low Oil juice machines. See also U.S. Pat. No. 4,376,409 to Belk, issued Mar. 15, 1983, and U.S. Pat. No. 4,309,943 to Larson et al, issued Jan. 12, 1982, for other examples of reciprocating cup-type juice extractors.

Unless the orange fruit has ben de-oiled, most reamer-type, rotating disc-type and reciprocating cup-type juice extractors will provide extracted juice having a titratable peel oil content above about 0.015% for Valencia fruit and typically above about 0.010% for non-Valencia fruit. Accordingly, a preferred step prior to juice extraction is to de-oil fruit. De-oiling of fruit can be achieved by using a sacrifier deice. Scarifiers work by pricking the surface of the orange fruit. This permits peel oil to exude out of the fruit. The exuded peel oil can be washed off of the fruit and removed to prevent its inclusion in the extracted juice. Suitable scarifiers for carrying out this de-oiling step include Brown Oil Extractors, Indelica to Scarifiers or Bertuzzi Citro Raps.

Not all juice extractors require a prior de-oiling operation in order to provide extracted juice having the previously specified maximum peel oil contents. One such juice extractor is the Model Low Oil Juice machine manufactured by FMC Corporation, Citrus Machinery Division, of Lakeland, Florida. The FMC Low Oil Juice machine is a reciprocating cup-type juice extractor which is capable of providing extracted juice having titratable peel oil contents of about 0.015% or less for Valencia fruit (typically about 0.010% or less for non-Valencia fruit) without a prior de-oiling step. Extracted juice having titratable peel oil contents as low as 0.006% can be obtained from Valencia fruit (as low as 0.004% when obtained from non-Valencia fruit) using this Low Oil Juice machine. Accordingly, a prior de-oiling step is optional with such Low Oil Juice extractors.

The extracted juice is partially finished by remving non-juice materials. As used herein, the term "non-juice materials" refers to any rag, seed or peel materials present in the extracted juice. These non-juice materials, which are relatively large in size, are essentially the waste product of juice extraction. More importantly, these non-juice materials contain undesirable bitter flavor compounds and enzymes (e.g., pectinesterase) which can be leached out by the extracted juice.

Accordingly, these non-juice materials need to be removed gently and quickly from the extracted juice. By "gently" is meant removal such that there is minimal expression of the bitter flavor compounds and enzymes from the nonjuice materials into the extracted juice, as well as minimal grinding of nonjuice materials. Gentle removal methods typically impart relatively low work-energy input to the extracted juice. By "quickly" is meant removal of these non-juice materials before excessive amounts of undesirable bitter flavor components and enzymes can be leached out by the extracted juice. Generally, removal of these non-juice materials within about 3 minutes of juice extraction is sufficient to avoid excessive leaching out of bitter flavor compounds and enzymes.

When a reamer-type or rotating disc-type juice extractor is used, partial finishing of the extracted juice requires the use of a primary finisher. Liquatex vibrating screens are particularly suitable primary finishers. In operation, the extracted juice is poured onto the screen of the finisher. The mesh size of the screen is such that the partially finished juice passes through the screen while non-juice materials are retained on the top thereof. This screen is gently vibrated to cause the non-juice materials to move to one side of the screen so that they can be removed. Vibration of the screen is such that a relatively low work-energy input is imparted to the juice, i.e. less than 5 BTU per gallon of extracted juice, preferablyless than 2 BTU per gallon of extracted juice. This low-energy work input prevents or minimizes expression of bitter flavor compounds and enzymes from non-juice materials. Other primary finisher devices, such a rotating screens, which impart low-work energy input to the extracted juice can also be used instead of a vibrating screen.

Although vibrating screen primary finishers gently and quickly remove non-juice materials from the extracted juice, they also reduce the effective yield of juice from the orange fruit. The low-work energy input required for gentle removal of non-juice materials results in fairly large amounts of desirable juice being entrained in the non-juice material stream. This entrained juice is usually difficult or impossible to recover from the non-juice materials. Accordingly, for increased juice yield, it is preferred to use reciprocating cup-type juice extractors. Reciprocating cup-type juice extractors do not require a primary finisher since juice extraction and removal of non-juice materials are carried out at the same time in about 1 second or less. This combined extraction/finishing operation prevents the entrainment of juice in the non-juice materials.

After non-juice materials have been removed, sensible pulp is then removed from the partially finished juice to provide a completely finished juice. As used herein, "sensible pulp" refers to insoluble pulp particles which have a size greater than about 0.5 mm. Sensible pulp can be removed from the partially finished juice by any suitable screw-type or paddle-type juice finisher, or by a vibrating screen. Examples of suitable screw-type finishers include Brown Model 2503 and 3600 screw finishers, FMC Model 35 screw finisher, and preferably FMC Model UCF 200 "close tolerance" finishers. Examples of suitable paddle-type finishers include the Brown Model 200 paddle finisher. See Nagy et al, supra, at pp. 196–99.

As can be gathered from its name, sensible pulp imparts mouth feel properties to orange juice and is, therefore, a desirable component of orange juice products. However, in order to properly process the feed juice, sensible pulp must be removed for at least two reasons. The first is to prevent absorption by the pulp of desirable orange aroma and flavor compounds. Once absorbed, these compounds cannot be easily removed during subsequent volatile stripping of the feed juice and represent an essence yield loss. In addition, sensible pulp needs to be removed for efficient evaporative concentration. Because of its size, any sensible pulp present in the feed juice can: (1)build up and plug equipment used in evaporative concentration, thus necessitating repeated cleaning operations to remove it; and (2) affect the feed juice flow pattern through the evaporators, thus lowering the juice solids content of the resulting concentrate or causing scorching of the juice solids.

Accordingly, the completely finished juice needs to be substantially free of sensible pulp. As used herein, "substantially free of sensible pulp" refers to a sensible pulp level of less than about 1% in the completely finished juice. Typically, the level of sensible pulp in the completely finished juice is as dose to 0% as possible. A screw-type of paddle-type finisher fitted with a 20 mesh screen will typically remove all (or almost all) of the sensible pulp. Once removed, the sensible pulp is typically processed further (e.g. pasteurized) and stored for subsequent inclusion in the final orange juice products.

After removal of the sensible pulp, the completely finished juice has a sinking pulp level of at least about 10%. Typically, the sinking pulp level of the completely finished juice is from about 12 to about 30%. The viscosity ofthis completely finished juice is at least about 10 centipoise, and is typically from about 12 to about 30 centipoise. This viscosity needs to be somewhat lower for efficient evaporative concentration of the feed juice, as well as to provide orange juice products having a texture/mouthfeel which more closely approaches hand-squeezed orange juice.

To lower the viscosity of the completely finished juice at least some of the sinking pulp is removed. The amount of sinking pulp removed is such that the resulting feed juice has sinking pulp level of about 8% or less (typical range of from about 5 to about 8%) for non-Valencia fruit and about 10% or less (typical range of from about 7 to about 10%) for Valencia fruit. This also result in the feed juice having a viscosity of about 8 centipoise or less (typical range of from about 5 to about 8 centipoise) for non-Valencia fruit and about 10 centipoise or less (typical range of from about 7 to about 10 centipoise) for Valencia fruit. Removal of sinking pulp from the completely finished juice is typically achieved by using centrifugation. However, other separation methods involving filters, juice finishers, belt presses and stationary screens can also be used to remove a portion of the sinking pulp from the completely finished juice to provide the feed juices of the present invention.

Surprisingly, the high quality feed juices of the present invention can be obtained at commercially useful juice yields. This is particularly true if reciprocating cup-type juice extractors are used. When such extractors are used, the feed juice of the present invention can be obtained at juice yields of at least about 90%. IN particular, juice yields of from about 92 to about 95% are achieveable when the FMC Low Oil Juice machine is used. (Under the definition below, it is possible to have juice yields in excess of 100%.)

For the method of the present invention, "juice yield" is based on the total amount of juice solids obtained per box of orange fruit (processed juice solids yield), relative to the amount of juice solids obtained per box of orange fruit by using a "state test" juice extractor ("state" juice solids yield) as specified in Florida regulation 20-63.001. In other words, the juice yield can be obtained by the following equation:

% juice yield = 100% × (processed juice solids yield)/("state" juice solids yield)

where processed juice solids yield = juice yield (per box) from process × solids content (°Brix) of juice, and where "state" juice solids yield = juice yield (per box) from "state test" extractor × solids content (°Brix) of juice.

Reciprocating cup-type juice extractors are also desirable in terms of increasing the yield of sensible pulp compared to reamer-type and rotating disc-type extractors. The primary finisher required to remove non-juice materials when a reamer-type or rotating disc-type juice extractor is used diminishes not only the juice yield but also the yield of sensible pulp. Accordingly, use of reciprocating cup-type extractors to obtain feed juices of the present invention provides an optimum combination of juice yield and sensible pulp yield.

The feed juices of the present invention are particularly useful in the aroma/flavor volatile stripping and evaporative concentration processes described hereafter in parts B and C of this application. However, these feed juices are also suitable for freeze concentration processes because of their relatively low viscosity and titratable peel oil content, and good orange aroma/flavor character. See U.S. Pat. No. 4,374,865 to Strobel, issued Feb. 22, 1983, for a suitable freeze concentration process.

The following are representative examples of feed juices obtained according to the present invention.

EXAMPLE 1

California Valencia packing house orange fruit having a size ranging from 2¼ to 3 inches were randomized and thoroughly washed to remove waxes prior to juice extraction. The washed fruit was extracted by using a Brown Model 400 juice extractor. The extractor was set to operate at ⅛ in. peel clearance, with a soft plastic cup-type and an extraction pressure of 20 psig. Approximately 350 fruit per minute were processed by this extractor.

Sensible pulp, membrane and seeds were removed from the exracted juice by passing it over a 4 sq. ft. Liquatex vibrating screen which had mesh opening of 0.066 in.

The resulting completely finished juice had the following physical and chemical characteristics:

| | |
|---|---|
| Brix | 13.7 |
| Titratable acidity (%) | 0.85 |
| Peel oil (%) | 0.012 |
| Glycosides (mg/100 ml) | 137 |
| Sinking pulp (%) | 16 |
| Flavor composition (ppb) | |
| Ethanol | 287,400 |
| Acetaldehyde | 9700 |
| Methanol | 24,500 |
| Ethyl butyrate | 150 |
| Ethyl 3-hydroxyhexanoate | 601 |
| Valencene | 8696 |
| Hexanal | 250 |
| alpha-Pinene | 407 |
| Myrcene | 2048 |
| Decanal | 337 |
| Linalool | 475 |
| Octanal | 0 |
| Ratio of more to less desirable compounds | 12.48 |

This completely finished juice can be passed through a desludger centrifuge operated at 1000 to 3000 g force to remove additional sinking pulp so as to provide a feed juice having a viscosity of about 10 centipoise or less and a sinking pulp level of about 10% or less.

EXAMPLE 2

Florida Pineapple orange fruit having a diameter of 2⅞ inches or less were thoroughly washed prior to juice extraction. The washed fruit was extracted by using an FMC Model Low Oil juice machine.

Sensible pulp was removed from the extracted juice by passing it through an FMC Model 35 screw finisher having a 20 mesh screen (i.e. 0.020 in. openings) and a pressure setting of 20 psig.

The resulting completely finished juice had the following physical and chemical characteristics:

| | |
|---|---|
| °Brix | 12.2 |
| Titratable acidity (%) | 0.69 |
| Peel oil (%) | 0.010 |
| Glycosides (mg/100 ml) | 151 |
| Sinking pulp (%) | 17 |
| Flavor composition (ppb) | |
| Ethanol | 408,760 |
| Acetaldehyde | 5530 |
| Methanol | 32,550 |
| Ethyl butyrate | 9.0 |
| Ethyl 3-hydroxyhexanoate | 3127 |
| Valencene | 21,094 |
| Hexanal | 27 |
| alpha-Pinene | 691 |
| Myrcene | 2487 |
| Decanal | 278 |
| Linalool | 195 |
| Octanal | 0 |
| Ratio of more to less desirable compounds | 16.94 |

This completely finished juice can be passed through a desludger centrifuge operated at 1000 to 3000 g force to remove additional sinking pulp so as to provide a feed juice having a viscosity of about 8 centipoise or less and a sinking pulp level of about 8% or less.

EXAMPLE 3

California Valencia orange fruit was randomized with decayed fruit being removed prior to deoiling. A Bertuzzi Citrorap CI 33/6 deoiler was set up with approximately 85°–90° F. rinse water sprays, rasping rolls at a maximum speed of 3000 rpm, and a feed auger speed of 8 rpm. An FMC Model 291 juice extractor (500 fruit processed per minute) was also used with the following machine settings:

| Cups | 3 inch standard |
|---|---|
| Peel clearance | 10/64 inch |
| Restrictor | 7/16 inch long bore |
| Strainer tube | 0.040 inch |
| Orifice tube | 1 inch |
| Beam setting | ¾ inch |

Two and one-half boxes of the washed oranges were dumped slowly into the deoiler and then collected in a strainer basket. A portion of these deoiled oranges were used to prime the extractor, with the extracted juice being discarded. As additional 60 lbs. of deoiled fruit was teen extracted. This extracted juice had a titratable peel oil content of 0.013%. This juice can be passed through a Model 35 screw finisher having a 20 mesh screen and a pressure setting of 20 psig to provide a completely finished juice. This completely finished juice can then be passed through a desludger centrifuge operated at 1000 to 3000 g force to remove additional sinking pulp so as to provide a feed juice having a viscosity of about 10 centipoise or less and a sinking pulp level of about 10% or less.

EXAMPLE 4

Florida Valencia orange fruit having a diameter of 2⅜ inches or less were thoroughly washed prior to juice extraction. The juice was extracted using an FMC Model Low Oil juice machine. The extracted juice was passed through an FMC UCF 200 finisher having a 20 mesh screen at a pressure setting of 20 psig.

The resulting completely finished juice had the following physical and chemical characteristic:

| °Brix | 11.9 |
|---|---|
| Titratable acidity (%) | 0.81 |
| Peel oil (%) | 0.011 |
| Glycosides (mg/100 ml) | 126 |
| Sinking pulp (%) | 13 |
| Viscosity (cps) | 14.1 |
| Flavor composition (ppb) | |
| Ethanol | 338,150 |
| Acetaldehyde | 5900 |
| Methanol | 30,200 |
| Ethyl Butyrate | 350 |
| Ethyl 3-hydroxyhexanoate | — |
| Valencene | 14,081 |
| Hexanal | 50 |
| alpha-Pinene | 505 |
| Myrcene | 1998 |
| Decanal | 95 |
| Linalool | 413 |
| Octanal | 0 |
| Ratio of more to less desirable compounds | 16.51 |

This completely finished juice can be passed through a desludger centrifuge operated at 1000 to 3000 g force to remove additional sinking pulp so as to provide a feed juice having a viscosity of about 10 centipoise or less and a sinking pulp level of about 10% or less.

EXAMPLE 5

Process grade Hamlin orange fruit which had been stored for approximately 24 hours prior to extraction was used. Several bins of fruit were blended to achieve a nominal 15 Brix/Acid ratio average, The blended fruit was washed with CS-100 at 100 ppm followed by a fresh water rinse. The cleaned fruit was visually inspected and graded immediately prior to extraction. After grading, the fruit exhibited less than 2% decay and 10% unwholesome defects.

The fruit was split into two size ranges. Small fruit (less than 3 inches in diameter) was fed to a first set of FMC Low Oil juice extractors. Large fruit (greater than 3 inches) was fed to a second set of FMC Low Oil Juice extractors.

Extracted juice, containing sensible pulp and seed defects, was collected in an enclosed manifold and surged into a feed tank. This juice was then pumped through hydro-clone deseeders operating at a nominal 75 psig back pressure to remove immature seed defects. The juice then was passed through a FMC UCF 200 finisher, operating with a 0.020 inch screen and 5 psig back pressure, to remove sensible pulp.

The pulp-free juice was surged into a level controlled tank prior to centrifugation. Westalia SB-80 desludger centrifuges, operating at 3000 force, removed sinking pulp from the juice stream. Feed rate and shot cycle times were adjusted to achieve desired viscosity reduction in the feed juice.

This feed juice was compared to hand-squeezed juice prepared from identical oranges whic had been cut in half, reamed gently on an Oster juicer and hand sieved through a 20 mesh screen. Analytical results ofthis comparison are shown below:

| | Hand-Squeezed Juice | Feed Juice of Present Invention |
|---|---|---|
| Brix° | 10.23 | 10.63 |
| Titratable Acidity (%) | 0.68 | 0.69 |
| Brix/Acid Ratio | 15.0 | 15.4 |
| Oil (%) | 0.0028 | 0.0052 |
| Sinking Pulp (%) | 13 | 6 |
| Viscosity (cps) | 9.0 | 5.2 |
| Ratio of More to Less Desirable Compounds | 57.67 | 23.15 |

B. Obtaining Aqueous Stripper Essence and Stripper Oil from Feed Juice

Another key aspect of the preset invention is to preserve the more desirable orange aroma and flavor compounds present in the feed juice without generating additional less desirable orange aroma and flavor compounds. The characteristic "fresh" compounds present in the feed juice include the low molecular weight alcohols (e.g. ethanol and methanol), aldehydes (e.g. acetaldehyde) and esters (e.g. ethyle butyrate and ethyl acetate). Since these "fresh" compounds are low-boiling, they can be easily lost due to volatilization. In addition, these low-boiling compounds, as well as certain desirable high-boiling compounds such as valencene are easily degraded during evaporative heat concentration of the feed juice. This typically leads to greater concentrations of less desirable orange aroma and flavor compounds such as linalool and alpha-terpineol.

The basic method for preserving these more desirable orange aroma and flavor compounds is disclosed in European patent application No. 110,638 to Powers et al, published June 13, 1984, which is incorporated by reference. The Powers et al process generally involves the following: (1) removal of orange aroma/flavor volatiles from the feed juice; and (2) recovering these volatiles in the form of an orange aroma/flavor condensate which is separated to provide an aqueous orange stripper essence and an orange stripper oil. The details of this process and the resulting stripper essence and stripper oil obtained are as follows:

1. Removal of Volatiles

The feed juice is passed through a device such as a heat exchanger to quickly raise the temperature of the juice to the feed temperature of the stripping column. This temperature ranges from about 100° F. (37.7° C.) to about 160° F. (71° C.); preferably temperatures of from 125° F. (51.7° C.) to 140° F. (60° C.) are used. Any suitable means can be used to heat the feed juice, e.g. shell and tube, plate or spiral heat exchangers or direct steam induction. Either low pressure steam or hot water can be used as the heating medium in the heat exchangers.

The hot feed juice is then pumped into the top of a stripper column which is operated under vacuum. The stripper column can consist of a vertical cylindrical vessel encompassing one or more stripping stages. Each stage consists of a means for distributing a fine spray of juice droplets across the whole circular cross section of the vessel. The juice is atomized so that the entire cross section of the column is covered with atomized juice droplets. This can be accomplished with pressure atomizing nozzles or by other means such as two-fluid nozzles or spinning disk atomizers. Either hollow or solid cone sprays can be produced.

The juice is contacted with a stripping agent such as steam, or an inert gas, i.e., nitrogen or carbon dioxide, to remove or strip away the aroma and flavor volatiles. Steam is preferred for this purpose because many of the volatiles are soluble in or co-distill with water and are thus easily removed. Condensation of the aroma and flavor volatiles is also easier to accomplish.

Steam or inert gas is introduced through the bottom of the stripper column. In general, from about 0.3 lbs. to about 1.5 lbs. of steam are used per each pound of soluble solids in the juice. Preferably, from 0.6 to 1.0 lbs. of steam per lb. of solids are used. Cut rate is defined as the pounds of steam per pound of soluble solids in the juice.

It is important that the vapor rising in the stripper column mix well with the feed juice spray, especially in the region near the nozzle so that the volatilized aromatic material can be carried away as part of the vapor stream. The partially or completely stripped feed juice is collected and pumped from the bottom of each stage. For the top stage and any intermediate stages, the feed juice is collected on a tray having a number of openings in it to allow for the vapor from the stage below to pass up the column and mix with the spray in each stage. The opening should be covered to prevent feed juice spray from passing directly into the stage below. Trays should be designed to minimize the feed juice holdup so that the overall exposure time of the feed juice to the 100° F. (37.7° C.) to 160° F. (71° C.) temperatures can be minimized. As feed juice is pumped from one stage to another, it can be heated by the use of heat exchangers or live steam injection to a temperature above the equilibrium temperature in the stripper column so that the feed juice flashes as it leaves the spray nozzles in that stage. In general, the feed juice should not be heated above 160° F. (71° C.) for longer than a few seconds.

The quantity of volatile components removed can be increased by increasing either the cut rate, the number of stages or the length of each stage. The amount of additional volatiles removed by increasing the cut rate above about 0.8 or 0.9 is usually small and must be balanced against that higher cost to remove the additional water condensed with the volatiles. Similarly, increasing the number of stages beyond 4 or 5 does not result in large increases in the amount of volatiles removed. The additional residence time of the feed juice at elevated temperature can result in the creation of off-flavors in the feed juice. Thus, the cut rate and the number of stages used can be varied to obtain the optimum balance of cost, volatile removal, and minimum degradation.

Care must be taken so that he steam does not impact on the surface of any feed juice that may be collected at the bottom of the stripper column. Water vapor from the added low pressure steam is passed counter currently through the juice spray to help remove and carry off the volatile materials as the vapor passes upward through each stage and out of the stripper column. In addition to steam, inert gases can also be used to strip the feed juices. Steam is preferred because the later concentration step removes water in its essentially pure form. When other inert gases are used, they must be separated from the volatiles using pressure equilibration techniques. These processes can cause loss of some of the aroma and flavor volatiles due to their high volatility.

The temperatures in the stripping stages can be from about 100° F. (37.7° C.) to about 160° F. (71° C.). Temperatures above 160° F. (71° C.) cause some degradation of the aroma and flavor of the juice. Preferably, the temperatures will be about 125° F. (51.7° C.) to about 140°0 F. (60° C.). Each stage can be operated at a different temperature. The temperatures can be progressively higher in each stage, or he same in all stages.

The pressure within the stripping column can be up to 9 inches of Hg. absolute and preferably is from about 2 to about 6 inches of mercury absolute. Most preferably, the stripping is carried out at pressures of from 3 to 5 inches of mercury absolute.

The stripped feed juice is pumped from the last stage and is either sent directly to the evaporation concentration system or else cooled and stored prior to evaporative concentration. If the juice is cooled, energy can be saved if the hot juice is used to partially heath incoming juice. It, in turn, is partially cooled.

2. Recovery of Stripped Volatiles

The stripped aroma and flavor volatiles are passed through a demister at the top of the stripper column and recovered by condensation at temperatures of from about 105° F. (40.6° C.) to about −320° F. (−196° C.). The actual temperature of condensation will depend upon the pressure within the condensation system. While the majority of the stripper volatile compounds in orange juice condense around −50° F. (−45.5° C.) at pressures of 2 to 9 inches of mercury absolute, condenser temperatures from about −60° F. (−51° C.) to about −320° F. (−196° C.) are sufficient to condenser substantially all of the stripped aroma and flavor volatiles at low pressures.

The condensation can be carried out using shell and tube heat exchangers, condensing in vertical tubes for the liquid condensing, and in the shell of a U-tube exchanger for freezing he condensate. The liquid condensing can also be accomplished in two or more condensers in series using cooling tower water for the first condenser and refrigerated coolant on subsequent condensers. Refrigerated coolants such as glycol and Freon can be used. Steam ejectors, mechanical vacuum pumps, or some combination can be used to reduce the pressure and remove non-condensables.

The aroma and flavor volatiles whic have been gently removed from the feed juice by stripping are preferably condensed in three stages. The first stage condenses primarily the water and some of the aroma and flavor volatiles; the second and third stages condense the remaining volatiles. The first stage condenser can be at a temperature of from about 60° F. (15.6° C.) to about 105° F. (40.6° C.), and preferably from 60° F. (15.6° C.) to 80° F. (26.7° C.). The second stage condenser can be at a temperature of from about 33° F. (0.5° C.) to about 60° F. (15.6° C.) and preferably from about 40° F. (4° C.) to about 50° F. (10° C.). This will insure collection of most of the water and the less volatile aroma and flavor materials (i.e. higher boiling compounds). The third condenser is at about −50° F. (−45.5° C.), and can be as low as liquid nitrogen temperatures (−320° F.). The aroma and flavor volatiles are condensed or collected as a frost in this third condenser. The collection efficiency of these low temperature condensers can be improved by pre-frosting the condensing surface using steam or a steam-noncondensable gas mixture. This provides more condensation sites for collection of the volatile mixture.

Care must be taken to avoid losing the volatiles which are condensed as the frost when the frost is added back to the liquid portion of the condensate. One way to accomplish this recombination is to collect the frozen portion on one condenser. After collecting the frost, the condenser is isolated from the vapor system and from the vacuum system and then filled with liquid condensate from the first condenser. This liquid can then be recirculated through the cryogenic condenser to metal the frost. The temperature of this melting should be at about 35° F. (1° C.) to about 45° F. (7° C.) so that the volatiles dissolve directly into the cold liquid and do not have an opportunity to volatilize.

A liquid ring vacuum seal pump can be used in place of the third condenser to recover low-boiling aroma and flavor volatiles. This type of vacuum pump includes a liquid seal formed by water or aqueous stripper essence which is in direct contact with the volatile stream. This liquid seal is sufficiently cool to condense and then absorb the aroma and flavor volatiles in the stream. This volatile-enriched seal water can be used, as is, to provide an aroma/flavor condensate, or else a portion thereof can be recycled to the stripper column, as described hereafter.

The condensate is a mixture of water-soluble volatiles such as ethanol, methanol, acetaldehyde, ethyl butyrate and ethyl acetate and oil volatiles such as valencene, d-limonene, myrcene, and alpha-pinene which are relatively insoluble in water. These volatile materials are present in a relatively stable emulsion of oil in water. Some oil may separate. The oil and aqueous phases can be separated by holding cold for long periods of time, by freezing and thawing, or preferably by centrifuging in a continuous stacked disc hermetic centrifuge. Two clear phases are obtained: (1) an aqueous stripper essence which is nearly free of oil components; and (2) a stripper oil. Small quantities of a wax-like substance collect in the centrifuge and must be removed periodically.

The aqueous stripper essence and stripper oil are stored in closed tanks with an inert gas blanket and are preferably shielded from light to prevent oxidation of the aroma and flavor compounds. The aqueous stripper essence can be stored at cool temperatures (e.g. 40° F. (4.4° C.) or less) prior to use. The stripper oil can be stored at low temperatures (−10° F.(−23.3° C.)) prior to use.

Preferably, part of the condensate from the first condenser (or from volatile-enriched seal water) is recycled to the top of the stripper column. This recycle stream can be heated or cooled in a heat exchanger to the desired temperature. Preferably the temperature is within about 20° F. (11° C.) of the water temperature corresponding to the equilibrium temperature of water at the pressure used in the stripper column. In the top of the stripper column, the recycled condensate is distributed over packing material incorporated within the top of the column. Most types of mass transfer packing can be used, such as Berl saddles, Raschig rings, or preferably Goodloe-type wire mesh packing. Enough packing to give the equivalent of 0.5 to 3.0 theoretical transfer units may be used. Permeably this would be packing equivalent to about 3 transferer units.

This recycle (rectification) process can be used to remove from 10% to up to 95% of the condensed water from the volatile stream (preferably up to 90% or 95%) without significant losses of volatile materials in the juice going out the bottom of the stripper column. This recycling serves to concentrate the aroma and flavor volatiles portion of the aqueous stripper essence.

The vacuum system used for the stripper column can be any commercial system capable of achieving the desired pressures, including multi-stage steam ejectors, vacuum pumps, or combinations. A liquid ring vacuum pump is preferred and a preferred type is one made with stainless steel which is a "sanitary" design. When this type of vacuum pump is used, the seal water can be added to the aqueous stripper essence or is recycled to the stripper column, as previously described, to recover additional small quantities of valuable volatile components. In addition small packed column scrubber can be used after the liquid ring vacuum pump is removed virtually all of the valuable volatile materials from the exiting gas steam. When the scrubber is used, the cold water (or other liquid) used as the scrubbing fluid can also be used as the seal fluid for the liquid ring vacuum pump in a counter current fashion.

3. Aqueous Stripper Essence and Stripper Oil

One product resulting from the previously described volatile stripping and recovery process is a unique aqueous orange essence. This stripper essence is characterized by a relatively high level of ethanol. Thelevel of ethanol is a fairly good indicator of the concentration of "fresh" compounds in the stripper essence. Generally, the higher the level of ethanol, the more "fresh" compounds will be present in the stripper essence. Stripper essences of the present invention comprise from about 0.5 to about 8% ethanol. Typically, stripper essences of the present invention comprise from about 1 to about 3% ethanol.

The stripper essence of the present invention is further characterized by a mixture of more desirable orange flavor compounds. For the purposes of the present invention, this mixture is defined by the combined amount of ethyl acetate, ethyl butyrate, and acetal dehyde present in the stripper essence. Stripper essences of the present invention comprise from about 100 to about 300 parts combined of ethyl acetate, ethyl butyrate nd acetaldehyde, per 10,000 parts ethanol. Typically, these stripper essences comprise from about 100 to about 200 parts combined of ethyl acetate, ethyl butyrate and acetaldehyde, per 10,000 parts ethanol.

The stripper essence of the present invention is further characterized by a mixture of less desirable orange flavor compounds. For the purpose of the present invention, this mixture is defined by the combined amount of hexanal and alpha-terpineol present in the stripper essence. Stripper essences of the present invention comprise from about 1 to about 10 parts combined of hexanal and alpha-terpineol, per 10,000 parts ethanol. Preferably, these stripper essences comprise from about 1 to about 5 parts combined of hexanal and alpha-terpineol, per 10,000 parts ethanol.

The stripper essence of the present invention is particularly characterized by a high ratio of more desirable orange flavor compounds (based on the combined amount of ethyl acetate, ethyl butyrate, and acetaldehyde) to less desirable orange flavor compounds (based on the combined amount of hexanal, and alpha-terpineol). This ratio is from about 10:1 to about 300:1, typically from about 35:1 to about 80:1. Preferred stripper essences have ratios of ethyl butyrate to combined hexanal/alpha-terpineol of from about 2:1 to about 5:1, and ethyl butyrate to hexanal of from about 3:1 to about 7:1. This high ratio of more desirable to less desirable compounds reflects the high quality of the feed juice used, as well as the preservation of the more desirable orange flavor compounds during volatile stripping and recovery. (The method for measuring the levels of ethanol, ethyl acetate, ethyl butyrate, acetaldehyde, hexanal and alpha-terpineol is described hereafter in the stripper essence analytical method section of part E of this application.)

The previously described volatile stripping and recovery process also provides a unique orange stripper oil. This stripper oil is characterized by its limonene content. Limonene is the predominant component of these stripper oils. Stripper oils of the present invention comprise from about 60 to about 90% limonene. Typical stripper oils comprise from about 65 to about 85% limonene.

The stripper oil of the present invention is further characterized by a fairly high level of valencene. Valencene provides a distinct "orangey" note to the stripper oil. Stripper oils of the present invention comprise from about 1 to about 15 parts valencene, per 100 parts limonene. Typical stripper oils comprise from about 3 to about 10 parts valencene, per 100 parts limonene.

The stripper oil of the present invention is further characterized by a mixture of less desirable orange flavor compounds. This mixture is defined by the combined amount of alpha-pinene, myrcene, octanal, decanal, and linalool present in the stripper oil. The combined amount of these five compounds is from about 1 to about 6 parts, per 100 parts limonene, for stripper oils of the present invention. Preferably, the combined amount of these five compounds is from about 1 to about 4 parts, per 100 parts limonene.

In particular, the stripper oil of the present invention is characterized by a high ratio of valencene to the combined amount of these five less desirable orange compounds. This ratio is from about 0.5:1 to about 15:1, typically from about 0.5:1 to about 3:1. Typical stripper oils have ratios of valencene to combined alpha-pinene and myrcene of from about 1:1 to about 6:1 (typically from about 1:1 to about 4:1) and valencene to combined octanal and decanal of from about 2:1 to about 10:1 (typically from about 2:1 to about 5:1. Like the stripper essence, this high ratio of valencene to less desirable compounds for the stripper oils of the present invention reflects the high quality of the feed juice used, as well as the preservation of valencene during volatile stripping and recovery. (The method for measuring limonene, valencene, alpha-pinene, myrcene, octanal, decanal and linalool is described hereafter in the stripper oil analytical method section of part E of this application.)

The following are representative examples of aqueous stripper essences and stripper oils according to the present invention:

EXAMPLE 1

A feed juice was obtained from Florida Early/Mid-season orange fruit using a Brown 400 juice extractor and juice processing conditions similar to those of Example 1 of part A of this application. This Florida Early/Mid season fed juice was pumped at the rate of 1800 lbs./hr. (818 kg./hr.) to a four-stage production stripper column. The column was 40 ft. (12 m.) long with an inside diameter of 24 in. (61 cm.). The column was operated under a vacuum of 3.5 in. (89 mm.) Hg (absolute).

The feed juice was initially heated to 126° F. (52.2° C.) before entering the first stage where it was sprayed into the stripper column through BETE FOG Model TFIY-FCN type nozzles. Since the juice was slightly above the equilibrium temperature and since it contained some dissolved air which would come out of solution, the expanding released air and small quantities of flashed water vapor caused the juice coming from the nozzles to be sprayed, the spray covering the entire cross section of the stripper column. Juice was collected from the first tray and pumped through a pipeline containing a direct injection steam nozzle where it was reheated to 128° F. (53.3° C.) and resprayed through the same type of nozzles as in the first stage. Juice was collected from the second tray and then pumped through a pipeline containing a direct injection steam nozzle where it was reheated to a temperature of 129° F. (53.9° C.) and resprayed, as in the second stage. Juice from the third tray was pumped through a pipeline containing a direct injection steam nozzle where it was reheated to a temperature of 145° F. (62.8° C.) and flashed into the stripper column as in the first stage. Juice collected from the bottom of the stripper column was pumped through a plate and frame heat exchanger to be cooled to a temperature of 125° F. (51.7° C.) by the incoming feed juice before being pumped to an evaporator feed take for further processing.

Culinary steam was sparged into the stripper column near the bottom, at a rate which when combined with all of the flashed vapor would give a cut rate of 0.8 lbs. steam/lb. of sugar solids. Since the Florida Early/Mid season feed juice in this example had a juice solids content of 11.3° Brix, the total steam flow rate was 161 lbs./hr. (73.2 kg./hr.). ]p The vapors generated passed through a stainless steel wire gauze mist eliminator and about 3 ft. (0.9 m.) of Goodloe-type wire gauze type packing to a two-stage shell and tube condenser. The firs stage was cooled with cooling tower water at about 64° F. (17.8° C.) while the second stage was cooled using 40° F. (4.4° C.) glycol. The condensate from the first stage was cooled to about 48° F. (8.9° C.) by passing it through a shell and tube heat exchanger cooled with 40° F. (4.4° C.) glycol. This condensate was then passed through a DeLaval 194F hermetic centrifuge to remove stripper oil. Seventy-five percent of this oil-free condensate was recycled by pumping it through a shell and tube heat exchanger to heat it to 126° F. (52.2° C.) and then spraying it through BETE FOG Model TFIY-FCN-type nozzles at the top of the stripper column so that it passed through the Goodloe-type wire gauze. The remaining 25% of this condensate was collected in a cold wall condensate collection tank and blanketed with nitrogen gas. The condensate from the second condenser was cooled to 48° C. (8.9° C.) by passing it through a shell and tube heat exchanger cooled with 40° F. (4.4° C.) glycol. This second condensate was added to the condensate collection tank.

The remaining vapors from the second stage were pulled through one of two shell and tube heat exchanger units which formed the third stage condenser. The vapors were condensed as a frost in the first unit by cooling it with liquid ammonia at about −60° F. (−51.1° C.). The flow of liquid ammonia was then stopped and the first unit was isolated from the vapor flow. The second unit was then brought on line to receive the vapor flow and condense the vapors as frost, as in the case of the first unit. The first unit was then warmed to about 40° F. (4.4° C.) with liquid ammonia with the frost being dissolved and removed by pumping through condensate from the collection tank. The two units were alternated in this vapor condensation/frost removal cycle at about 1 hour intervals.

The remaining vapors from the third stage condensor were then passed through a vacuum pump. Most of the vapor discharged from the vacuum pump was recycled back to the third stage condensor. The remaining non-condensible vapors were discharge to the atmosphere.

The condensate from the collection tank was pumped through a DeLaval 194F hermetic centrifuge at a rate of about 2 gpm. The centrifuge continuously separated the condensate into two clear streams. The stripper oil was taken off as the light component nd collected (along with stripper oil from the recycled condensate) under nitrogen gas in a 55 gallon (208 l.) stainless steel-drum. These drums were stored at 0° F. (−17.8° C.). The heavier aqueous stripper essence was pumped to a cold wall storage tank and held at 40° F. (4.4° C.) under nitrogen.

The aqueous stripper essence was found to have the following composition after gas chromatographic analysis (see Part E of this application):

| Compound | Amount (ppm) | Parts per 10,000 Parts Ethanol |
| --- | --- | --- |
| Ethanol | 14,601 | — |
| Acetaldehyde | 186.0 | 127.4 |
| Ethyl acetate | 13.15 | 9.01 |
| Ethyl butyrate | 17.01 | 11.65 |
| Hexanal | 3.11 | 2.13 |
| alpha-Terpineol | 2.93 | 2.01 |

The stripper oil obtained was found to have the following composition after gas chromatographic analysis (see part E of this application):

| Compound | Amount (mg./ml.) | Parts per 100 Parts Limonene |
| --- | --- | --- |
| Limonene | 776.18 | — |
| Valencene | 25.08 | 3.23 |
| alpha-Pinene | 2.57 | 0.33 |
| Myrcene | 13.97 | 1.80 |
| Octanal | 1.86 | 0.24 |
| Decanal | 3.04 | 0.39 |

-continued

| Compound | Amount (mg./ml.) | Parts per 100 Parts Limonene |
| --- | --- | --- |
| Linalool | 0.96 | 0.12 |

EXAMPLE 2

A feed juice was obtained from Florida Valencia orange fruit using an FMC Low Oil juice extractor and juice processing conditions similar to those of Example 2 of part A of this application. This Florida Valencia feed juice (12.9° Brix) was pumped at the rate of 1600 lbs./hr. (727 Kg./hr.) to a four-stage stripper column as in Example 1. The operating conditions for this column were as follows:

| | |
| --- | --- |
| First stage temp. | 131° F. (55° C.) |
| Second stage temp. | 133° F. (56.1° C.) |
| Third stage temp. | 124° F. (51.1° C.) |
| Fourth stage temp. | 125° F. (51.7° C.) |
| Bottoms temp. | 125° F. (51.7° C.) |
| Vacuum | 3.5 in. (89 mm) Hg absolute |
| Cut rate | 0.8 lbs. steam/lb sugar solids |
| Steam flow rate | 165 lbs./hr. (75 kg./hr) |

The vapors generated from the stripper column were passed through the mist eliminator and wire gauze packing to a two-stage shell and tube condensor as in Example 1. The first stage was cooled with cooling tower water at about 71° F. (21.7° C.) while the second stage was cooled using 40° F. (4.4° C.) glycol. Seventy-five percent of the condensate from the first stage was recycled by cooling and removing stripper oil from it as in Example 1, heating it to 130° F. (54.4° C.) and then spraying it through the top of the stripper column as in Example 1. The remaining 25% of the condensate from the first stage, as well as the condensate from the second stage, were collected in the collection tank, as in Example 1.

The remaining vapors from the second stage were passed through a vacuum pump. The vapors discharged from the vacuum pump were bubbled through the condensate in the collection tank. The collected condensate was separated into an aqueous stripper essence and stripper oil as in Example 1.

The aqueous stripper essence was found to have the following composition after gas chromatographic analyst (see part E of the application):

| Compound | Amount (ppm) | Parts per 10,000 Parts Ethanol |
| --- | --- | --- |
| Ethanol | 15,744 | — |
| Acetaldehyde | 215.0 | 136.6 |
| Ethyl acetate | 14.11 | 8.96 |
| Ethyl butyrate | 13.07 | 8.30 |
| Hexanal | 2.56 | 1.63 |
| alpha-Terpineol | 0.89 | 0.56 |

The stripper oil obtained was found to have the following composition after gas chromatographic analysis (see part E of this application):

| Compound | Amount (mg./ml.) | Parts per 100 Parts Limonene |
| --- | --- | --- |
| Limonene | 694.49 | — |
| Valencene | 59.86 | 8.62 |
| alpha-Pinene | 2.41 | 0.35 |

-continued

| Compound | Amount (mg./ml.) | Parts per 100 Parts Limonene |
|---|---|---|
| Myrcene | 12.34 | 1.78 |
| Octanal | 1.67 | 0.24 |
| Decanal | 5.07 | 0.73 |
| Linalool | 0.60 | 0.09 |

C. Evaporative Concentration of Feed Juice

The feed juice (as is or stripped of aroma/flavor volatiles according to part B of this application) is evaporatively concentrated to provide an orange juice concentrate having a high juice solids content as measured by its Brix value. The primary function of evaporative concentration is to remove water from the feed juice. However, evaporative concentration can also perform the additional function of deactivating pectinesterase enzymes present in the feed juice. This prevents or greatly reduces demethoxylation of pectin in the juice and subsequent undesirable jellification in the orange juice concentrate.

The heating which occurs during evaporative concentration can cause the oxidation and degradation of any orange aroma and flavor compounds which remain in the feed juice. This can result in the generation of undesired cooked off-flavor. In addition, heating the juice during evaporative concentration to too high a temperature for too long a period of time can greatly increase the viscosity of the resulting orange juice concentrate. Accordingly, evaporative concentration needs to be conducted in a manner which minimizes the generation of cooked off-flavor, as well as insuring that the resulting orange juice concentrate has a relatively low viscosity.

The evaporative concentration processes of the present invention provide orange juice concentrates having a juice solids content of from about 55° to about 75° Brix. Preferred evaporative concentrates of the present invention have juice solids content of from about 60° to about 70° Brix. These evaporative concentrates retain more of the desirable high-boiling flavor compounds, in particular valencene. They also tend to better display added orange aroma/flavor volatiles, in particular volatiles present in the aqueous orange stripper essences and orange stripper oils obtained from the stripped feed juices according to part B of this application.

The evaporative orange juice concentrates of the present invention have a relatively low viscosity. In particular, the viscosity of these concentrates ranges from about 500 to about 6000 centipoise when measured at a temperature of 8° C. Preferred concentrates of the present invention have viscosities of from about 2000 to about 4000 centipoise. By comparison, orange juice concentrates (58° to 72° Brix) prepared from current commercial feed juices by conventional TASTE evaporator systems typically have viscosities of from about 8,000 to about 20,000 centipoise. The viscosity of the concentrates of the present invention is also relatively low when measured over a range of shears, i.e. the concentrates of the present invention are less resistant to flow. This lower resistance to flow means that the orange juice concentrates of the present invention melt faster and mix quicker with water than current commercial orange juice concentrates. (The method for measuring the viscosity of evaporative orange juice concentrates of the present invention is described hereafter in the evaporative concentrate analytical methods section of part E of this application.)

The evaporative orange juice concentrates of the present invention have either no pectinesterase activity or else a relatively low levels such activity. In particular, evaporative concentrates of the present invention have a pectinesterase activity of about $0.5 \times 10^{-4}$ P.E. units or less per °Brix, preferably about $0.1 \times 10^{-4}$ P.E. units or less per °Brix. This pectinesterase activity is sufficiently low to prevent the demethoxylation of pectins which could result in jellified lumps forming that would increase the viscosity the concentrate. (The method for measuring the pectinesterase activity of evaporative orange juice concentrates of the present invention is described hereafter in the evaporative concentrate analytical methods section of part E of this application.)

A particularly important characteristic of the orange juice concentrates of the present invention is their relatively low level of cooked off-flavor. The term "cooked off-flavor" covers a variety of flavor descriptors. These descriptors include "cardboard-like", "caramelized", "pineapple-overripe fruit-like", "apricot-like", "candy-like", and so forth. The presence of cooked off-flavor in the concentrate is an indicator of how much thermal abuse the juice has been subjected to during evaporative concentration. In particular, TASTE concentrates, which are typically subjected to high temperatures for relatively long periods of time, often have what is described as a high level of cooked off-flavor.

For the purposes of the present invention, the relative level of cooked off-flavor in the evaporating orange juice concentrate is measured by the % retained valencene. As used herein, the term "% retained valencene" refers to the amount of valencene in the orange juice concentrate, relative to the amount of valencene in the feed juice before evaporative concentration (when the concentrate and feed juice are normalized to a juice solids content of 11.8° Brix). Valencene can be volatilized from the juice due to heat. Accordingly, it is believed that a high% retained valencene is indicative of an orange juice concentrate which has been subjected to less thermal abuse during evaporative concentration.

For evaporative concentrates of the present invention, the % retained valencene is at least about 28. Typically % retained valencene is from about 28 to about 55. By contrast, conventional TASTE concentrates prepared from current commercial feed juices have a % retained valencene of from about 11 to about 25. (The level of valencene is measured by the tissue homogenization analytical method described hereafter input E of this application.)

The preferred evaporative concentration process of the present invention starts with a feed juice having: (1) a juice solids content of from about 9° to about 14° Brix, preferably from bout 10° to about 12.5° Brix; (2) a viscosity of about 10 centipoise or less (i.e., from about 5 to about 8 centipoise for non-Valencia feed juices, from about 7 to about 10 centipoise for Valencia feed juices), and typically from about 6 to about 9 centipoise, when measured at a temperature of 8° C.; (3) a sinking pulp level of about 10% or less (i.e., from about 5 to about 8% for non-Valencia feed juices and from about 7 to about 10% for Valencia feed juices), and typically from about 6 to about 9%; and (4) pectinesterase activity of from about $1 \times 10^{-4}$ to about $5 \times 10^{-4}$ P.E. units per °Brix (typically from about $1 \times 10^{-4}$ to about $3 \times 10^{-4}$ P.E. units per °Brix). The relatively low viscosity and sinking pulp level of the feed juice is particularly important to the viscosity of the resulting orange juice concentrate. It is also important to efficient evaporative concentration of the feed juice.

The preferred evaporative concentration process of the present invention involves a plurality of evaporators. The evaporates used in this preferred process are typically static surface evaporators. As used herein, the term "static surface evaporator" refers to an evaporator where the surface (or surfaces) in contact with juice is essentially stationary. There are at least two models of static surface evaporators which are suitable for carrying out this preferred process. One is the Sigmastar® plate evaporator made by W. Schmidt Gmbh & Co. K. G. of Bretten, West Germany. See U.S. Pat. No. 4,572,766 to Dimitriou, issued Feb. 25, 1986 (herein incorporated by reference ), which discloses the structure of these Sigmastar® plate evaporators. The other is a cassette-type evaporator made by Alfa-Laval AB of Tumba, Sweden. See U.S. Pat. No. 4,586,565 to Hallstrom et al, issued May 6, 1986 (herein incorporated by reference), which discloses the structure of these cassette-type evaporators. Sigmastar® plate evaporators are particularly preferred static surface evaporates.

In this preferred evaporative concentration process, the feed juice is initially preconcentrated so as to have a juice solids content of from about 15° to about 25° Brix. Preferably, the feed juice is preconcentrated to a juice solids content of from about 15° to about 18.5° Brix. This preconcentration of the feed juice is carried out by heating it in one or more evaporators at temperatures in the range of from about 95° to about 160° F. The feed juice is heated for an average of from about 5 to about 25 seconds per evaporator. Typically, the fed juice is heated for an average of from about 15 to about 20 seconds per evaporators.

The number of evaporators used during this preconcentration of the feed juice will depend on a number of factors, in particular the amount of feed juice which is being processed. Steam or vapors previously generated from the feed juice can be used to supply the heat form these evaporators. Where two or more evaporators are used in this preconcentration step, the temperatures used generally increase as the juice solids content of the feed juice increases. The particular number of evaporators, the heating temperatures used in each evaporator, as well as the heating time for each evaporator, should be selected so as to minimize the generation of cooked off-flavor.

A key aspect of this preferred evaporative concentration process is the intermediate concentration step used to further concentrate this preconcentrated feed juice. This intermediate concentration step also serves the critical function of deactivating pectinesterase enzymes present in the preconcentrated feed juice. Achievement of these objectives without generating a high level of cooked off-flavor requires the selection of a particular critical combination of processing conditions for this intermediate step. These critical conditions include: (1) the juice solids content of the entering preconcentrated fed juice; (2) the temperature to which this preconcentrated feed juice is heated during this intermediate concentration step; (3) the time period over which the preconcentrated feed juice is heated during this intermediate concentration step; (4) the degree of shear across the heated surface of he evaporator to which the preconcentrated feed juice is subjected during this intermediate concentration step; and (5) the juice solids content of he resulting intermediately concentrated feed juice.

This intermediate concentration step is carried out by heating the preconcentrated feed juice (juice solids content of from about 15° to about 25° Brix and pectinesterase activity of from about $1\times10^{-4}$ to about $5\times10^{-4}$ P.E. units per °Brix. Z) under vacuum in one or more evaporators to temperatures ranging from about 160° to about 180° F. under conditions of high shear across the heated surface of each evaporator. This intermediate step is usually carried out at pressures ranging from about 4.5 to about 7.5 psia for an average of from about 5 to about 25 seconds per evaporator. Preferably, the preconcentrated feed juice is heated to temperatures ranging from about 165° to about 177° F. at pressures ranging from about 5.5 to about 7 psia for an average of from about 15 to about 20 seconds per evaporator. The resulting intermediately concentrated feed juice has a juice solids content of from about 25° to about 40° Brix with a pectinesterase activity of about $0.5\times10^{-4}$ P.E. units or less per °Brix. Preferred intermediately concentrated feed juices have juice solids contents of from about 30° to about 37° Brix.

The deactivation of pectinesterase enzymes without excessive generation of cooked off-flavor still requires careful selection of the processing conditions during the intermediate concentration step within the broad ranges defined above. For example, the higher the heating temperature and the longer the average heating time used in this intermediate concentration step, the lower should be the juice solids content of the resulting intermediately concentrated feed juice to avoid the generation of cooked off-flavor. Conversely, the lower the juice solids consent of the resulting intermediately concentrated feed juice, the higher should be the heating temperature and the longer should be the heating time to insure effective deactivation of pectinesterase enzymes present in the juice.

Conducting he intermediate concentration step under conditions of high shear across the heated surface of the evaporator(s) has also been found to be important in deactivating pectinesterase enzymes present in the juice. Static surface evaporators (e.g., Sigmastar® plate evaporates) used in carrying out this intermediate step generally operate by heating a thin film of juice (e.g., a film having an average thickness of about 0.004 in. or less) flowing at high velocity (e.g., about 100 ft. per sec. or greater at the vapor-liquid interface) over the surface of the evaporator. Accordingly, as used herein, the term "high shear across the heated surface of each evaporate" refers to the type of shear generated by such films flowing at such velocities across the evaporator surface. It is believed that the shears generated during the intermediate concentration step are such that eh components of the juice act as if they are being "stretched".

The intermediately concentrated juice is subsequently heated in one or more evaporators at temperatures in the range of from about 170° to about 100° F. for an average of from about 5 to about 25 seconds per evaporator to provide a highly concentrated juice having a juice solids content of from about 55° to about 75° Brix. This subsequent concentration of the intermediately concentrated juice is basically for the purpose of achieving a particular juice solids content in the final orange juice concentrate. Generally, the heating temperatures and heating times are selected so as to efficiently achieve the final desired juice solids content without generating significant amounts of cooked off-flavor. In particular, as the juice solids content of the intermediately concentrated feed juice increases, the heating times, and especially heating temperatures, should conversely decrease to avoid generation of cooked off-flavor. As in the case of obtaining the preconcentrated feed juice, the number of evaporators used depends primarily on the amount of juice being processed and the desired steam economy, i.e., the amount of steam used. The highly concentrated juice is then rapidly cooled to a temperature of about 65° F. or less (typically to from about 50° to about 55° F.) to provide the final orange juice concentrate.

A specific seven-stage evaporative system involving Sigmastar ® plate evaporates for carrying out the preferred evaporative concentration process of the present invention is shown schematically in the FIG. and is indicated by the number 10.

The seven evaporative stages used in system 10 are labeled E1 through E7. The flow of feed juice FJ through this evaporative concentration system is indicated by the solid arrows. This feed juice is heated in each of evaporative stages E1 through E7 by steam supplied from sources S1 and S2, and vapors generated from the feed juice, as indicated by the open arrows. Prior to entering the evaporative concentration system 10, feed juice FJ is sent to balance tank 12 and then pumped to preheater 14 (typically a plate and frame heat exchanger) which typically heats the feed juice to a temperature of about 113° F.

The preheated feed juice enters the evaporative concentration system 10 at evaporative stage E6, which comprises two Sigmastar ® late evaporators connected in parallel. The feed juice is preconcentrated by passing successively through evaporative stage E6, through an interchanger indicated by 18 (typically a plate and frame heat exchanger) which typically heats the juice to a temperature of about 146° F., and then through evaporative stages E4 and E3. Each of stages E3 and E4 comprise two Sigmastar ® plate evaporators connected in parallel. This preconcentrated feed juice then passes through an interchanger indicted by 22 (typically a plate and frame heat exchanger), which typically heats the juice to about 170° F. before it reaches evaporative stage E1.

Evaporative stages E1 and E2 are where the crucial intermediate concentration step occurs. Stages E1 and E2 each comprise on Sigmastar ® plate evaporator. After the intermediately concentrated juice leaves evaporative stages E1 and E2, it is further concentrated by passage through evaporative stages E5 and E7. Stages E5 and E7 each comprise one Sigmastar ® plate evaporator. As shown in the Figure, the highly concentrated juice having the desired juice solids content leaves evaporative stage E7, passes through a product cooler indicated by 26 (typically a plate and frame heat exchanger) where it is typically cooled rapidly to a temperature of about 60° F. or less. The cooled orange juice concentrate then exits the product cooler as indicated by the letter P for further processing into orange juice products.

During heating of the juice in evaporative stages E1 through E7, vapor is generated which contains both water and orange aroma/flavor volatiles. Some of his vapor condenses in each evaporative stage. Most of the condensate from stage E1 is in the form of water which is typically discarded. The vapor from stages E2 through E7, and especially E3, E4 and E6, contains significant amounts of orange aroma/flavor volatiles which can be collected and then processed in an aroma recovery system (not shown) to recover useful orange aroma/flavor materials. (The vapors from E1, E2, E5 and E7 have lesser amounts of orange aroma/flavor volatiles.)

In order to heat the juice in each of evaporative stages E1 through E6, steam indicated by S1 is supplied to thermocompressor 30. This thermocompressor also contains a portion (typically 50%) of the vapor generated by evaporative stage E1 which is recycled, as indicated by the broken arrow, for increased steam efficiency. The steam/vapor stream from thermocompressor 30 heats the juice passing through evaporative stage E1. The remaining portion of the vapors generated from stage E1, as indicated by the open arrow, enter evaporative stage E2 where they heat the juice passing through this stage. (In an optional embodiment, 80% of these remaining vapors can go to stage E2 and 20% can go to stage E3.) As shown by the open arrows, vapors generated in stages E2, E3, E4 and E5 are used to heat the juice passing through stages E3, E4, E5 and E6, respectively. (In an optional embodiment, 80% of the vapor generated in stage E4 can go to stage E5, while the remaining 20% go to stage E6.) The vapor stream from evaporative stage E6 is cooled (typically in tube and shell heat exchanger) to condense water, along with at least some of the orange aroma/flavor volatiles. This condensate from stage E6 is then collected and processed in the aroma recovery system as previously discussed.

As shown in the Figure, the juice passing through evaporative stage E7 is heated by steam from a second source indicated by S2. During heating of the juice in stage E7, the steam becomes sufficiently cool so as to condense. This condensed steam from stage E7 can be collected and used as a heating medium for preheater 14, or interchangers 18 or 22.

Some typical operating conditions (heating temperatures, pressures, juice solids content of exiting juice) for this seven stage evaporative system are shown into following Table (starting feed juice of 11.6° Brix):

| Evaporative Stage | Temp. (°F.) | Pressure (psia) | Solids Content Exiting Juice (°Brix) |
|---|---|---|---|
| E1 | 172 ± 2 | 6.2 | 26.6 |
| E2 | 160 ± 2 | 4.8 | 35.4 |
| E3 | 150 ± 2 | 3.8 | 15.2 |
| E4 | 141 ± 2 | 3.0 | 14.5 |
| E5 | 125 ± 2 | 2.0 | 46.2 |
| E6 | 111 ± 2 | 1.3 | 12.3 |
| E7 | 116 ± 4 | 1.5 | 64.7 |

On a smaller scale, the preferred evaporative concentration process of the present invention can be carried out in a system involving four evaporative stages. This smaller system uses evaporative stages E6 and E3 (one Sigmastar ® evaporator for each stage) to preconcentrate the juice (starting juice solids content of 12° Brix), evaporative stage E1 (one Sigmastar ® evaporator) to carry out the intermediate concentration step, and evaporative stage E5 (one Sigmastar ® evaporator) to further concentrate the intermediately concentrated juice to the desired juice solids content for the final evaporative orange juice concentrate. Some typical operating conditions (heating temperatures, pressures, juice solids content of exiting feed juice) are shown in the following table:

| Evaporative Stage | Temp. (°F.) | Pressure (psia) | Solids Content Exiting Juice (°Brix) |
|---|---|---|---|
| E1 | 174 ± 2 | 6.5 | 37.1 |
| E3 | 159 ± 2 | 5.2 | 18.4 |
| E5 | 135 ± 2 | 2.2 | 65.0 |
| E6 | 110 to 122 | 1.2 to 1.8 | 14.4 |

Another, less preferred, evaporative concentration process for preparing orange juice concentrates of the present invention involves a centrifugal cone evaporator. This centrifugal cone evaporator has at least one rotatable hollow cone-shaped member. While the rotatable member is being rotated, the feed juice is sprayed onto its underside surface. The rotational speed is sufficiently great to centrifugally spread the feed juice under conditions of high shear across the underside surface. Due to gravity, the feed juice flows downwardly to the bottom of the rotating member.

The underside surface of the rotating member is heated, usually by steam which is typically supplied through jackets formed in the rotating member. Typically, the steam is supplied at a saturated steam temperature from about 185° to about 235° F. (preferably from about 212° to about 227° F.). This insures that the feed juice flowing across the heated underside surface of the rotating member is heated to a maximum temperature of from about 100° to about 135° F., preferably from about 110° to about 125° F. Since the feed juice is heated under a vacuum (typically from about 20 to about 30 in. of Hg). it is concentrated due to evaporation. The resulting vapors which form pass out through the top of the rotating member. When the highly concentrated juice reaches the bottom of the rotating member, it has a juice solids content of from about 55° to about 75° Brix. This highly concentrated juice is typically centrifugally forced upwardly through an outlet to an expansion cooler (typically a shell and tube heat exchanger) where it is cooled immediately to a temperature of about 90° F. or less (typically to from about 70° to about 85° F.) to provide the orange juice concentrate.

A suitable centrifugal cone evaporator for use in this process is the Centri-Therm evaporator made by Alfa-Laval AB, of Tumba, Sweden. In a Centri-Therm evaporator, the cone-shaped member is typically rotated at a speed of from about 1000 to about 1500 rpm. This rotational speed provides an average feed juice film thickness on the underside surface of the cone-shaped member of about 0.002 inches or less with a velocity across this underside surface of about 50 ft. per second or greater at the vapor-liquid interface. Typically, the average residence time of the juice on the underside surface of the rotating cone-shaped member of the Centri-Therm evaporator is about 1 second or less. See also U.S. Pat. No. 4,405,652 to Boucher, issued Sept. 20, 1983 (especially FIG. 4 and Column 3, lines 5 to 45), which describes the structure and operation of centrifugal cone evaporators in reducing the alcohol content of wine.

While centrifugal cone evaporators provide orange juice concentrates having glow viscosities with minimized levels of cooked off-flavor, the evaporative concentration process of the present invention involving a plurality of static surface evaporators is preferred for a number of reasons. One is the ability to handle large volumes of feed juice, as well as the cost of capital equipment. Another is efficient utilization of steam (i.e. better steam economy) in the evaporative concentration process. Most importantly, because the feed juice is heated in the centrifugal cone evaporator to maximum temperatures to flow to deactivate enzymes, the starting feed juice has to have low pectinesterase activity, i.e. about $0.5 \times 10^{-4}$ P.E. units or less per °Brix. This requires: (1) extremely gentle juice processing conditions to produce low pectinesterase activity feed juices, usually at greatly decreased juice yield; or (2) pasteurization of the feed juice before concentration which can affect flavor quality and increase capital equipment costs. These factors together make the preferred process involving a plurality of static surface evaporators more commercially attractive for obtaining large quantities of evaporative orange juice concentrate having relatively low viscosities with minimized levels of cooked off-flavor.

The following are representative examples of orange juice concentrates obtained by the evaporative concentration processes of the present invention:

EXAMPLE 1

A Florida Early/Mid season fed juice which had been obtained under juice processing condition is similar to those described in Example 2 of part A of this application and which had been stripped of aroma/flavor volatiles under conditions similar to those described in Example 1 of part B of this application was used. The characteristics of this stripped feed juice were as follows:

| Brix | 11.6° |
|---|---|
| Viscosity | 6.0 cps |
| Sinking pulp | 8% |

The stripped feed juice was fed at the rate of 102 gallons per minute to a seven-stage evaporative system involving Sigmastar ® plate evaporators. The operating conditions of this system were as follows:

| Evaporative Stage | Temp. (°F.) | Pressure (psia) | Solids Content Exiting Juice (°Brix) |
|---|---|---|---|
| E1 | 172 ± 2 | 6.2 | 26.6 |
| E2 | 160 ± 2 | 4.8 | 35.4 |
| E3 | 150 ± 2 | 3.8 | 15.2 |
| E4 | 141 ± 2 | 3.0 | 14.5 |
| E5 | 125 ± 2 | 2.0 | 46.2 |
| E6 | 111 ± 2 | 1.3 | 12.3 |
| E7 | 116 ± 4 | 1.5 | 64.7 |

The highly concentrated juice from the E7 stage was rapidly cooled to about 60° F. The resulting orange juice concentrate had the following physical and chemical characteristics:

| Brix | 64.7° |
|---|---|
| Brix/acid ratio | 14.8 |
| Viscosity | 3383 cps |
| Sinking pulp | 7% |
| Glycosides | 94.8 mg./100 ml. |
| P.E. units | 0 |
| Valencene | 615.9 ppb |
| % Retained valencene | 28.4 |

EXAMPLE 2

A Florida Valencia feed juice which had been obtained under juice processing conditions similar to those described in Example 4 of part A of this application and which had been stripped of aroma/flavor volatiles under conditions similar to those described in Example 2 of part B of this application was used. This stripped feed juice had a solids content of 12° Brix.

The stripped feed juice was fed at the rate of 17.8 gallons per minute to a four-stage evaporator system involving Sigmastar ® plate evaporators. The operating conditions of this system were as follows:

| Evaporative Stage | Temp. (°F.) | Pressure (psia) | Solids Content Exiting Juice (°Brix) |
| --- | --- | --- | --- |
| E1 | 174.5 | 6.7 | 37.1 |
| E3 | 159.1 | 4.3 | 18.4 |
| E5 | 135.2 | 2.4 | 65.0 |
| E6 | 121.3 | 1.2 to 1.8 | 14.4 |

The highly concentrated juice from the E7 stage was rapidly cooled to about 50° F. The resulting orange juice concentrate had the following physical and chemical characteristics:

| Brix | 66.1° |
| --- | --- |
| Brix/acid ratio | 14.5° |
| Viscosity | 3075 cps |
| Sinking pulp | 8% |
| Glycosides | 120 mg/100 ml |
| P.E. Units | $0.15 \times 10^{-4}$ |
| Valencene | 6950 ppb |
| % Retained valencene | 43.6 |

EXAMPLE 3

Late season Florida Valencia packing house oranges 2.5 to 3.5 inches in size were hand sorted to remove any undesirable fruit. The oranges were extracted with a Brown Model 400 juice extractor operating at high peel clearance (3/16 inch) to minimize the oil content in the juice. The rag and seeds were removed from this extracted juice by using a Liquatex vibrating screen (10 mesh), followed by removal of the sensible pulp using a Brown Model 3600 screw finish (20 mesh). The feed juice obtained had a solids content of 12.2° Brix.

The feed juice was concentrated using a Centri-Therm CT-1B centrifugal cone evaporator. The operating conditions of this evaporator were as follows:

| Feed rate | 0.23 gal./min. |
| --- | --- |
| Steam temp. | 104°-108° C. |
| Rotational speed | 1200 rpm |
| Vacuum | 27.0-27.5 in. Hg |
| Vapor temp. | 40°-41° C. |

The highly concentrated juice from the evaporator was cooled by the chiller to about 78° F. The resulting orange concentrate obtained had the following physical an chemical characteristics:

| Brix | 63.9° |
| --- | --- |
| Brix/Acid ratio | 17.9 |
| Sinking pulp (at 11.8° Brix) | 6% |
| Glycosides (at 11.8° Brix) | 107 mg./100 ml. |

D. Single-STrength orange juice products and orange juice concentrates.

The orange juice products of the present invention can be in the form of either single-strength orange juice products, or else in the form of orange juice concentrates. The single-strength orange juice products have a juice solids content of from about 8° to about 14° Brix. Preferably, such products have a juice solids content of from about 11° to about 13° Brix. For the orange juice concentrates, the juice solids content is from about 35° to about 65° Brix. Preferably, the juice solids content is from about 40° (3 to 1 concentrate) to about 60° (5 to 1 concentrate) Brix.

An important characteristic of these orange juice products is their relatively low viscosity. The single-strength products have a viscosity of about 7 centipoise or less at a temperature of 8° C. These single-strength products typically have a viscosity of from about 4 to about 6 centipoise. The orange juice concentrates of the present invention, when are constituted with water to a juice solids content of about 11.8° Brix, provide single-strength orange juice beverages having viscosities like those of single-strength orange juice products of the present invention, i.e., about 7 centipoise or less at 8° C., with a typical viscosity range of from about 4 to about 6 centipoise. (The viscosity of orange juice products of the present invention is measured by the same methods used for the feed juice of part A of this application.)

Another important characteristic of orange juice products of the present invention is their relatively low pectinesterase activity. Orange juice products of the present invention have a pectinesterase activity of about $0.5 \times 10^{-4}$ P.E. units or less per °Brix, and preferably about $0.1 \times 10^{-4}$ P.E. units or less per °Brix. This relatively low pectinesterase activity prevents the demethoxylation of pectins which can jellify the juice produ20 Brix. This relatively low pectinesterase activity prevents the demethoxylation of pectins which can jellify the juice produ20 Brix. This relatively low pectinesterase activity prevents the demethoxylation of pectins which can jellify the juice product and thus increase its viscosity. (The pectinesterase activity of orange juice products of the present invention is determined by the same method used for the evaporative orange juice concentrates of part C of this application.)

Another important characteristic of orange juice products of the present invention is their level of titratable oil. The titratable oil content of these products is about 0.015% or less (for concentrate products, the titratable oil content is based on dilution to a juice solids content of 11.8° Brix).The range of titratable oil contents is typically from about 0.004 to about 0.015%. Preferred orange juice products of the present invention have a titratable oil content of about 0.010% or less. The typical range of titratable oil contents for these preferred products is from about 0.004 to about 0.010%. (The titratable oil content of orange juice products of the present invention is measured by the same method used to measure the tiratable peel oil content of the feed juice of part A of this application.)

Another important characteristic of orange juice products of the present invention is their orange aroma and flavor component. A key compound in this orange aroma/flavor component is ethanol. The level of ethanol is usually an indicator of the concentration of "fresh" compounds in the orange juice product. The level of ethanol in orange juice products of the present can be from about 400,000 to about 1,200,000 parts per billion (ppb). Preferred orange juice products have an ethanol level of from about 500,000 to about 1,000,000 ppb.

The "fresh" aroma/flavor characteristics of orange juice products of the present invention are further defined by four other key volatile compounds. These compounds are acetaldehyde, methanol, ethyl butyrate, and ethyl 3-hydroxyhexanoate. For acetaldehyde, this amount is from about 4,000 to about 20,000 ppb, preferably from about 7000 to about 14,000 ppb. For methanol, this amount is from about 10,000 to about 60,000 ppb, preferably from about 25,000 to about 50,000 ppb. For ethyl butyrate, this amount is from about 500 to about 2000 ppb, preferably from about 700 to about 1400 ppb. Forethyl 3-hydroxyhexanoate, this amount is from about 100 to about 700 ppb, preferably from about 100 to about 500 ppb. (The levels of ethanol, actaldehyde, methanol and ethyl butyrate in orange juice products of the present invention are measured by the purge and trap analytical method described hereafter in part E of this application. The level of ethyl 3-hydroxyhexanoate is measured by the tissue homogenation analytical method described hereafter in part E of this application.)

Another important compound defining the orange aroma/flavor component of orange juice products of the present invention is valencene. The level of valencene is an important indicator of how "orangey" the orange juice product is. For orange juice products of the present invention, the amount of valencene is from about 2000 to about 20,000 ppb. Preferably, this amount is from about 3000 to about 10,000 ppb. (The level of valencene in orange juice products of the present invention is measured by the tissue homogenation analytical method described hereafter in part E of this application.)

The orange aroma/flavor component of orange juice products of the present invention is also characterized by a higher level of these more desirable "fresh" and "orangey" compounds relative to the level of less desirable orange flavor compounds. The less desirably orange flavor compounds include terpenes such as alpha-pinene and myrcene, and oxidation products such as hexanal, decanal, linalool, octanol, 4-terpineol, alpha-terpineol, dodecanal and nootkatone. For orange juice products of the present invention, the level of more desirable "fresh"/"orangey" compounds to less desirable orange compounds is defined by the ratio of the combined amount of acetaldehyde, ethyl butyrate, ethyl 3-hydroxyhexanoate and valencene, to the combined amount of hexanal, alpha-pinene, myrcene, decanal, linalool, octanol, 4-terpineol, alpha-terpineol, dodecanal and nootkatone. This ratio is at least about 2:1, and typically ranges from about 2:1 to about 10.3:1, for orange juice products of the present invention. By comparison, this ratio is no more than 1.5 for current commercial orange juice products prepared from orange juice concentrate and is at least 10.4 for hand-squeezed orange juice prepared from Florida Valencia oranges.

For orange juice products of the present invention, the level of each of the above less desirable orange flavor compounds are as follows:

| Compound | Typical Level (ppb) |
|---|---|
| hexanal | about 10 to about 30 |
| alpha-pinene | about 100 to about 2000 |
| myrcene | about 500 to about 3000 |
| decanal | about 100 to about 1500 |
| linalool | about 200 to about 2000 |
| octanol | about 10 to about 300 |
| 4-terpineol | about 50 to about 300 |
| alpha-terpineol | about 50 to about 300 |
| dodecanal | about 30 to about 300 |
| nootkatone | about 50 to about 1000 |
| | Preferred Level (ppb) |
| hexanal | about 30 to about 200 |
| alpha-pinene | about 100 to about 1500 |
| myrcene | about 800 to about 2800 |
| decanal | about 50 to about 1000 |
| linalool | about 200 to about 1000 |
| octanol | about 10 to about 250 |
| 4-terpineol | about 50 to about 200 |
| alpha-terpineol | about 50 to about 200 |
| dodecanal | about 50 to about 200 |
| nootkatone | about 100 to about 500 |

(The level of hexanal in orange juice products of the present invention is measured by the purge and trap analytical method described hereafter in part E of this application. The levels of the remaining less desirable orange compounds are measured by the tissue homogenization analytical method described hereafter in part E of this application.)

The orange juice products of the present invention are formulated to an appropriate ratio of Brix solids to titratable acidity (TA). For orange juice products of the present invention, this Brix solids to TA ratio can be from about 12 to about 20. Preferred orange juice products of the present invention have a Brix solids to TA ratio of from about 14 to about 17. This ratio can be adjusted by appropriate blending of concentrates having varying Brix solids to TA ratios.

The orange juice products of the present invention are also formulated to have an appropriate level of sensible pulp. For single-strength products, the level of sensible pulp can be from 0 to about 3%. Preferably, single-strength products have a sensible pulp level of from about 1 to about 2%. For orange juice concentrates, the level of sensible pulp can be from about 2 to about 8%. Preferred orange juice concentrates have a sensible pulp level of from about 4 to about 6%.

The orange juice products of the present invention also have a particularly low level of sinking pulp. As previously mentioned with regard to the fed juice in part A of this application, the level of sinking pulp can have a significant effect on viscosity. Orange juice products of the present invention typically have a sinking pulp level of from about 4 to about 10%. Preferred orange juice products have a sinking pulp level of from about 6 to about 9%. (The method for measuring the sinking pulp level of orange juice products of the present invention is the same used for feed juices of part A of this application.)

The orange juice products of the present invention are formulated by appropriate blending of orange juice concentrate, aroma and flavor materials, sensible pulp, and water. The preferred source of orange juice concentrate is that obtained by the evaporative concentration process described in part C of this application. This preferred orange juice concentrate can be blended with orange juice concentrates obtained by other methods so long as these other concentrates are fairly bland in flavor and relatively low in viscosity. From about 30 to 100% of this preferred orange juice concentrate is blended with from 0 to about 70% other concentrates. Preferably, from about 50 to 100% (most preferably from about 90 to 100%) of this preferred orange juice concentrate is blended with from 0 to about 50% (most preferably from 0 to about 10%) other concentrates.

As previously mentioned, the orange juice concentrate used in preparing orange juice products of the present invention involves blending concentrates having varied ratios of Brix solids to TA. In addition, the orange juice concentrate used in formulating orange juice products of the present invention typically involves blending concentrates obtained from different varieties of orange fruit. These orange juice concentrates are typically derived from Florida Early/Midseason and Valencia orange fruit. Concentrates obtained from Florida Valencia orange fruit are particularly preferred for orange juice products of the present invention. Concentrates obtained from other orange fruit, in particular Brazilian Valencia fruit, can be formulated together with concentrates obtained from Florida Early/Midseason and Valencia fruit. Typically, orange juice concentrates used in formulating orange juice products of the present invention comprise the following blends of concentrates: from 0 to about 30% concentrate derived from Florida Early/Midseason fruit; from about 50 to 100% concentrate derived from Florida Valencia fruit; and from 0 to about 50% concentrate derived from Brazilian Valencia fruit. Preferably, this blend of concentrates comprises from a 0 to about 20% concentrate derived from Florida Early/Midseason fruit, from about 50 to 100% concentrate derived from Florida Valencia fruit, and from 0 to about 50% concentrate derived from Brazilian Valencia fruit.

The orange juice concentrates used in formulating the orange juice products of the present invention are fairly bland in terms of orange aroma/flavor. Accordingly, materials need to be added to this concentrate to impart the characteristic aroma and flavor of orange juice. A preferred source of the aroma/flavor materials are the aqueous orange stripper essence and orange stripper oil obtained according to part B of this application. These stripper essences and stripper oils are particularly preferred due to their high ratio of more desirable orange flavor compounds to less desirable orange flavor compounds.

The particular orange aroma and flavor characteristics of these preferred stripper essences and stripper oils can vary depending on the feed juice from which they were obtained. Stripper essences and stripper oils which are obtained from feed juices derived from Florida Valencia orange fruit have the most preferred orange aroma and flavor characteristics. The stripper essence comprises from 0 to about 50% (preferably from 0 to about 20%) Florida Early/Midseason and/or Brazilian Valencia essence and from about 50 to 100% (preferably from about 80 to 100%) Florida Valencia essence. Typical stripper oils used comprise similar amounts of Early/Midseason/Brazilian Valencia oils and Florida Valencia oils.

While the stripper essences and stripper oils prepared according to part B of this application provide a significant portion of the desired orange aroma/flavor impact, other sources of aroma/flavor materials are often used in addition. For example, commercial orange essences such as Florex 50041 (20:1 ethyl butyrate to hexanal ratio) and 56010, made by Florex Flavors Ltd. of Eaton Park, Florida, and Natural Orange Aroma (#070570), Natural Orange Aroma Plus (#375002U), and Enriched Orange 3 Fold Essence Oil (#375212U), made by Redd Citrus Specialities of Safety Harbor, Florida, and commercial orange oils such as Florex 5801R, Citriff Orange #15980267, made by International Flavors and Frangrances, Inc. of New York City, N.Y., Valencene 85-90% purity (Citrus & Allied), made by Citrus & Allied Essences, Ltd. of Floral Park, N.Y.) and cold pressed peel oils, can be used to supply at least a portion of the aroma/flavor materials for orange juice products of the present invention. Non-orange sources of natural flavorings such as Orange with Other Natural Flavors #15980828, made by International Flavors and Fragrances, Inc., and Natural Citrus Enhancer, Orange type made by Fries & Fries, Inc. of Cincinnati, Ohio, can also be used as a source of aroma/flavor materials.

The source of sensible pulp for formulating orange juice products of the present invention is typically that removed from the partially finished juice as described in part A of this application. Commercial sources as sensible pulp that are fairly bland in flavor and which have not been excessively abused or damaged can also be used in orange juice products of the present invention.

A tyipcal blending sequence in the preparation of orange juice products of the present invention is as follows: an intermediate concentrate is prepared by adding a portion of the orange juice concentrate and the orange essence materials to a blend tank, followed by the orange oil materials and the remaining orange juice concentrate. Blending of these materials to form the intermediate concentrate is preferably done at a maximum temperature of about 30° F. Once all materials have been added to the blend tank, they are typically mixed for at least 30 minutes to insure that the orange oil materials are distributed homogeneously throughout the intermediate concentrate. This intermediate concentrate is preferably stored at a maximum temperature of about 20° F. prior to use.

Since-strength orange juice products and orange juice concentrates of the present invention are prepared by blending this intermediate concentrate with the appropriate amount of sensible pulp, orange aroma/flavor materials and water. A tyipcal blending sequence involves adding water and sensible pulp to a blend tan, followed by the simultaneous addition of the intermediate concentrate and orange aroma/flavor materials. Water or intermediate concentrate can be added to this mixture for appropriate Brix solids adjustment. Also, orange oil material scan be added to achieve the appropriate titratable oil content.

Once prepared, the orange products of the present invention can be filled into cans, foil-like containers, cartons, bottles or other appropriate packaging. The single-strength orange juice products re typically pasteurized or sterilized prior to being filled into the packaging. In the case of orange juice concentrate products, these products are typically frozen after being filled into cans.

Representative examples of orange juice products made according to the present invention are as follows:

EXAMPLE 1

Late season Florida Valencia packing house oranges 2.5 to 3.5 inches in size were hand sorted to remove any undesirable fruit. The oranges were extracted with a Brown Model 400 juice extractor operating at high peel clearance (3/16 inch) to minimize the oil content in the juice. The rag and seeds were removed from this extracted juice by using a Liquatex vibrating screen (10 mesh), followed by removal of the sensible pulp using a Brown Model 3600 screw finisher (20 mesh). The feed juice obtained had the following chemical and physical characteristics:

| Brix | 12.2° |
|---|---|
| Titratable acidity | 0.73 |
| Peel oil | 0.008% |
| Glycosides | 101 mg./100 ml. |

The orange aroma nd flavor volatiles from a portion of this feed juice were stripped, condensed and collected using processing conditions similar to those described in Example 2 of part B of this application. The Valencia stripper essence obtained had the following composition:

| Compound | Amount (ppm) |
|---|---|
| Ethanol | 8826 |
| Acetaldehyde | 134 |
| Ethyl acetate | 8.08 |
| Ethyl butyrate | 8.93 |
| Hexanal | 0.43 |
| alpha-Terpineol | 0.63 |

The remaining unstripped feed juice was concentrated using a Centri-Therm CT-1B centrifugal cone evaporator. The operating conditions of this evaporator were as follows:

| Feed rate | 0.23 gal./min. |
|---|---|
| Steam temp. | 104°–108° C. |
| Rotational speed | 1200 rpm |
| Vacuum | 27.0–27.5 in. Hg. |
| Vapor temp. | 40°–41° C. |

The highly concentrated juice from the evaporator was cooled by the chiller to about 78° F. The resulting orange concentrate obtained had the following physical and chemical characteristics:

| Brix | 63.9° |
|---|---|
| Titratable acidity | 3.57 |
| Sinking pulp (at 11.8° Brix) | 6% |
| Glycosides (at 11.8° Brix) | 107 mg./100 ml. |

The orange juice concentrate product was prepared from the following ingredients:

| Ingredients | Amount (wt. %) |
|---|---|
| Valencia concentrate | 63.8 |
| Valencia stripper essence | 20.9 |
| Essence blend* | 0.3 |
| Flavor booster** | 0.17 |
| Sensible pulp | 4.8 |
| Water | 10.0 |
| | 100.0 |

*Essence blend composition
Valencia TASTE essence - 35%
Early/Midseason TASTE essence - 15%
Natural Orange Aroma Plus (#375002U) - 25%
Natural Orange Aroma (#070570) - 25%
**Flavor Booster composition:
D8118 Natural Citrus Enhancer, Orange Type - 3.3%
Orange with Other Natural Flavors (#15980828) - 1.7%

-continued

Ethanol - 95.0%

In preparing this product, sensible pulp, Valencia stripper essence, essence blend, 10% of the Valencia concentrate and 90% of the water were combined in a blend tank and mixed for about 5 minutes to form an intermediate concentrate. The remaining Valencia concentrate and water was then added to this intermediate concentrate and mixed for an additional 10 minutes. During the last 5 minutes of this mixing, the flavor booster was added. The blend tank was insulated and chilled by a glycol system to keep the product between 32° and 40° F. during blending. The finished orange juice concentrate product was packed into 12 oz. cans and then stored at −10° F. The physical and chemical characteristics of this orange juice concentrate product were as follows:

| Brix | 42.4° |
|---|---|
| Titratable acidity | 2.42 |
| Peel oil (at 11.8% Brix) | 0.006% |
| Sinking pulp (at 11.8% Brix) | 8% |
| Flavor Composition (ppb) | |
| Acetaldehyde | 13,591 |
| Ethanol | 919,285 |
| Methanol | 42,371 |
| Ethyl butyrate | 1299 |
| Ethyl 3-hydroxyhexanoate | — |
| Valencene | 7310 |
| Hexanal | 34 |
| alpha-Pinene | 280 |
| Myrcene | 944 |
| Decanal | 396 |
| Linalool | 385 |
| Octanol | 104 |
| 4-Terpineol | — |
| alpha-Terpineol | 92 |
| Dodecanal | 130 |
| Nootkatone | 395 |

EXAMPLE II

Later season Florida Valencia oranges were washed, sorted to remove any undesirable fruit and deoiled using a Brown oil Extractor. The deoiled oranges were extracted with Brown Model 400 and 700 juice extractors operating at high peel clearance (⅛ inch and ¼ inch, respectively) to minimize the oil content in the juice. The rag and seeds were removed from this extracted juice by using a Liquatex vibrating screen (6 mesh), followed by removal of the sensible pulp using a Brown Model 3900 screw finisher (20 mesh), and removal of additional sinking pulp using a centrifuge. Two feed juices were obtained, the second of which had significantly more sinking pulp removed. The chemical and physical characteristics of these two feed juices prior to centrifugation were as follows:

| | First | Second |
|---|---|---|
| Brix | 11.3° | 12.6° |
| Titratable acidity | 0.61 | 0.74 |
| Peel oil | 0.011% | 0.013% |
| Glycosides | 124 mg./100 ml. | 120 mg./100 ml. |
| Sinking pulp | 14% | 16% |

The orange aroma and flavor volatiles from the first feed juice were stripped, condensed and collected using processing conditions similar to those used in Example I. The Valencia stripper essence obtained had the following composition:

| Compound | Amount (ppm) |
| --- | --- |
| Ethanol | 10975 |
| Acetaldehyde | 82 |
| Ethyl acetate | 1.6 |
| Ethyl butyrate | 3.3 |
| Hexanal | 1.0 |
| alpha-terpineol | 2.8 |

The first and second feed juices were concentrated using four Schmidt Sigmastar plate evaporators under processing conditions similar to those described in Example 2 of part C of this application. The Valencia concentrates obtained had the following physical and chemical characteristics:

|  | First | Second |
| --- | --- | --- |
| Brix | 61.2° | 61.4° |
| Titratable acidity (at 11.8° Brix) | 3.4 | 3.8 |
| Sinking pulp (at 11.8° Brix) | 8% | 2% |

The orange juice concentrate product was prepared from the following ingredients:

| Ingredients | Amount (wt. %) |
| --- | --- |
| Valencia concentrate* | 67.3 |
| Valencia stripper essence | 13.9 |
| Essence blend** | 0.33 |
| Flavor Booster*** | 0.17 |
| Stripper oil | 0.0085 |
| Cold pressed peel oil | 0.0085 |
| Sensible pulp | 4.8 |
| Water | 13.5 |
|  | 100.0 |

*80% of first concentrate, 20% of second concentrate
**Essence blend composition: Natural Orange Aroma Plus (#375002U) - 75% Natural Orange Aroma (#070570) - 25%
***Flavor Booster composition: #D8118 Natural Citrus Enhancer, Orange Type - 3.3% Orange with Other Natural Flavors (#15980828) - 1.7% Ethanol - 95.0%

In preparing this product, sensible pulp, Valencia stripper essence, essence blend, 10% of the Valencia concentrate and 90% of the water were combined in a blend tank and mixed for about 5 minutes. The stripper oil and cold pressed oil were added to this blend ad then mixed for 5 minutes to form an intermediate concentrate. The remaining Valencia concentrate and water was then added to this intermediate concentrate and mixed for an additional 10 minutes. During the last 5 minutes of this mixing, the flavor booster was added. The finished orange juice concentrate product was packed into 12 oz. cans and then stored at −10° F. The physical and chemical characteristics of this orange juice concentrate product were as follows:

| Brix | 41.7° |
| --- | --- |
| Titratable acidity (at 11.8° Brix) | 0.69 |
| Peel oil (at 11.8° Brix) | 0.006% |
| Sinking pulp (at 11.8% Brix) | 8% |
| Viscosity (at 11.8° Brix) | 5.8 cps (average) |
| Flavor Composition (ppb) | |
| Acetaldehyde | 7745 |
| Ethanol | 888.442 |

| | |
| --- | --- |
| Methanol | 27,436 |
| Ethyl butyrate | 917 |
| Ethyl 3-hydroxyhexanoate | 121 |
| Valencene | 6341 |
| Hexanal | 144 |
| alpha-Pinene | 195 |
| Myrcene | 846 |
| Decanal | 311 |
| Linalool | 752 |
| Octanol | 21 |
| 4-Terpineol | 63 |
| alpha-Terpineol | 163 |
| Dodecanal | 52 |
| Nootkatone | 237 |

EXAMPLE III

Florida Valencia oranges were washed and sorted to remove any undesirable fruit. Using juice processing conditions similar to those described in Example 4 of part A of this application, the oranges were extracted with an FMC Low Oil juice extractor. The sensible pulp was removed from this extracted juice by using a FMC Model UCF 200 screw finisher, followed by removal of additional sinking pulp using a centrifuge. The feed juice obtained had the following chemical and physical characteristics:

| Brix | 12.3° |
| --- | --- |
| Titratable acidity | 0.91 |
| Peel oil | 0.012% |
| Glycosides | 120 mg./100 ml. |
| Sinking pulp | 10% |
| Viscosity | 9.0 cps |

The orange aroma and flavor volatiles in this feed juice were stripped, condensed and collected using processing conditions similar to those used in Example II. The Florida Valencia stripper essence obtained had the following composition:

| Compound | Amount (ppm) |
| --- | --- |
| Ethanol | 13177 |
| Acetaldehyde | 119 |
| Ethyl acetate | 4.3 |
| Ethyl butyrate | 3.6 |
| Hexanal | 0.9 |
| alpha-Terpineol | 1.2 |

The stripped feed juice was concentrated using four Schmidt Sigmastar plate evaporators under processing conditions similar to those described in Example 2 of part C of this application. The Florida Valencia concentrate obtained had the following physical and chemical characteristics:

| Brix | 63.2° |
| --- | --- |
| Titratable acidity | 4.39 |
| Sinking pulp (at 11.8° Brix) | 8% |
| Viscosity (at 11.8° Brix) | 5.6 |
| Glycosides (at 11.8° Brix) | 116 mg./100 ml. |

Orange juice concentrate and single-strength products were prepared from the following ingredients:

| Ingredients | Amount (wt. %) |
|---|---|
| Florida Valencia Concentrate | 32.6 |
| Brazilian TASTE Concentrate* | 32.2 |
| Florida Valencia stripper essence | 5.6 |
| Brazilian stripper essence** | 2.9 |
| First Essence Blend*** | 0.4 |
| Florex Aroma #10 | 0.8 |
| Second Essence Blend**** | 0.16 |
| Stripper oil | 0.019 |
| Cold pressed peel oil | 0.008 |
| Enriched Orange 3 Fold Essence Oil (#375212U) | 0.001 |
| Oil Blend***** | 0.005 |
| Sensible pulp | 4.8 [7.4]****** |
| Water | 20.5 [17.9]****** |
| | 100 |

*Brazilian TASTE concentrate physical and chemical characteristics: Brix - 64.1° Titratable acidity - 3.86 Peel oil - 0.006% Sinking pulp - 8% Viscosity (at 11.8° Brix) - 6.1 cps
**Obtained from Brazilian Valencia feed juice under similar processing conditions as Florida Valencia stripper essence.
***Same as Essence Blend in Example II.
****Second Essence Blend composition: Florida Valencia stripper essence - 67% Florex #56010 - 33%
*****Oil Blend composition: Florida Valencia stripper oil - 8.3% Florida Early-/Mid stripper oil - 3.0% Cold Pressed Valencia peel oil - 20.4% Enriched Orange 3 Fold Essence Oil (#375212U) - 38.0% Citriff Orange (#15980267) - 23.2% C&A Valencene (85–90% purity) - 7.1%
******No. in brackets concentrate blend for single-strength product In preparing the concentrate product, sensible pulp, the stripper essences, the essence blends, 10% of the total concentrate and 90% of the water were combined in a blend tank and mixed for about 5 minutes. The stripper oil, cold pressed peel oil, essence oil and oil blend were then added and mixed for five minutes to form an intermediate concentrate. The remaining concentrate and water was then added to this intermediate concentrate and mixed for an additional 10 minutes. The finished orange juice concentrate product was packed into 12 oz. cans and then stored at −10° F. The single-strength product was prepared the same as the concentrate product, except than the finished concentrate was diluted with the appropriate amount of water and then sterilized before being filled into cartons for storage at 34° F. The physical and chemical characteristics of these orange juice products were as follows:

| | Concentrate | Single-Strength |
|---|---|---|
| Brix | 41.8° | 11.6° |
| Titratable acidity (at 11.8° Brix) | 0.75 | 0.76 |
| Peel oil (at 11.8° Brix) | 0.013% | 0.013% |
| Sinking pulp (at 11.8° Brix) | 8% | 8% |
| Viscosity (at 11.8° Brix) | 5.4 cps | 5.3 cps |
| Flavor Composition (ppb) | | |
| Acetaldehyde | 10,471 | |
| Ethanol | 706,053 | |
| Methanol | 44,775 | |
| Ethyl butyrate | 1012 | |
| Ethyl 3-hydroxyhexanoate | 243 | |
| Valencene | 3648 | |
| Hexanal | 127 | |
| alpha-Pinene | 1447 | |
| Myrcene | 2740 | |
| Decanal | 861 | |
| Linalool | 943 | |
| Octanol | 213 | |
| 4-Terpineol | 196 | |
| alpha-Terpineol | 163 | |
| Dodecanal | 111 | |
| Nootkatone | 101 | |

E. Analytical Methods
1. Feed juice and orange juice products
a. Purge and trap head space analysis The purge and trap head space analytical system consists of a Hewlett-Packard (HP) 7675A purge and trap sampler and a HP 5880A gas chromatograph (G.C.). This analytical system is modified for automatic operation. Sample introduction to a capillary column is achieved by adding a four port valve to the 7675A sampler and a cold trap to the column oven of the 5880A G.C.

A 1 ml. sample of juice is placed into a sampling container (15 ml. volume culture tube) equipped with a Teflon ®-coated stirring bar. After equilibration in a water bath (27±1° C.) for 5 minutes with magnetic stirring, the volatile compounds are swept into a room temperature adsorption tube, by helium at a rate of 10 ml./min. for 1 minutes. The adsorption tube is filled with 200 mg. of Tenax ® (80/100 mesh) adsorbent (Applied Science Division of Milton Roy C.) and a small plug of silylated glass wool at each end to keep the adsorbent in place. This hydrophobic polymer selectively adsorbs the organic volatiles and the helium stream containing water is vented to atmosphere. The Tenax ® tube is then flushed one more minute with clean, dry helium gas (10 ml./min., flow rate) to remove water from the trap. (This water can cause clogging problems by ice formation in the cold trapping system of the capillary column.)

Sample injection into a capillary column is performed via desorption of the Tenax ® trap and reconcentration of the adsorbed sample onto the firs portion (2 inches) of the capillary column. Thermal desorption is effected by rapidly heating the Tenax ® tube to 200° C. for 8 minutes with helium flowing through it at a flow rate of 2.7 ml./min. The front portion of the capillary column is located inside a trap cooled with liquid nitrogen (−150° C.). The sample is swept from the Tenax ® tube onto the capillary column where it condenses out in a narrow band at liquid nitrogen temperatures. For injection of the sample into the capillary column, after cooling, this cold trap is heated very rapidly: it takes about 20 seconds to reach 140° C. and the temperature is held at 140° C. for 1 minute. The helium switching valves and the cooling and heating sequences of the cold trap are controlled automatically in a pre-programmed mode.

The capillary column used is a Durawax-3 fused silica capillary column (J&W Scientific, Inc., 0.32 mm. i.d×60 m. length). Durawax-3 is a stabilized liquid phase which contains 50% of Carbowax-20M and 50% of methyl silicone. The carrier gas flow (He) at the capillary column outlet is 2.7 ml./min. (linear gas velocity=34.5 cm./sec. at 40° C.). The injection port and flame ionization detector temperatures are set at 180° C. and 2209° C., respectively. The column oven temperature is held at 50° C. for 18 minutes, raised to 70° C. at 1.5° C./min., then raised at 5° C./min. to 145° C. and then held at 145° C. for 8 minutes.

The compounds are identified by the renting times of peaks obtained for known standards and mass spectrometry. The purge and trap head space analytical system was connected directly to a Finnigan Mat 4500 mass spectrometer using a Super INCOS data system. Integration of peak area is obtained by use of a Hewlett-Packard 5880A series terminal, level four, or a Hewlett-Packard 3357E Laboratory Automation System. This automated head space analytical system provides good precision for most of the aroma compounds (percent relative standard deviation=5.0—14.7%, n=6). Juice samples are analyzed at single strength, i.e, at 11.8° Brix.

In order to quantitate the concentration of the five identified components (acetaldehyde, methanol, ethanol, ethyl butyrate and hexanal) in the orange juice, a linear regression analysis is performed using standard addition of individual components into orange juice stripped of its volatile components. Five different concentration ranges with duplicated analytical data are used to construct the linear regression equation shown in Table 1. Y represents peak area of the individual components on the chromatogram. The concentration of the components in the orange juice (ppm) is expressed as X (ppm can be converted to ppb by multiplying it by 1000). From these equations, the concentration of the five components in the orange juice is calculated from the peak area on the head space chromatogram obtained under the same analytical condition.

TABLE 1

Linear Regression Equation of Five Flavor Components and its Correlation Coefficient in Orange Juice Obtained Using Purge and Trap Headspace Analysis

| Component | Linear Regression Equation | Correlation Coefficient |
| --- | --- | --- |
| Acetaldehyde | Y = 158.94X + 1.88 | 0.998 |
| Methanol | Y = 13.30X + 51.20 | 0.998 |
| Ethanol | Y = 24.53X + 681.53 | 0.993 |
| Ethyl butyrate | Y = 790.75X − 1.20 | 0.998 |
| Hexanal | Y = 326.58X + 18.95 | 0.995 | b. Tissue Homogenization Method

The tissue homogenization (TH) method is based on a direct extraction of the orange juice flavor components with a solvent, methylene chloride. After homogenization, the solvent layer is separated and evaporated to a small volume. Quantitation is done using an internal standard.

A calibration standard is prepared as indicated below:

| Compound | Amount (g) | mg./ml. |
| --- | --- | --- |
| Nootkatone | 0.0694 | 0.6926 |
| Valencene | 0.4682 | 3.7456 |
| Dodecanal | 0.0410 | 0.3161 |
| d-Carvone | 0.0468 | 0.4610 |
| Decanal | 0.3382 | 3.1385 |
| alpha-Terpineol | 0.0920 | 0.9053 |
| Ethyl-3-hydroxyhexanoate | 0.0930 | 0.9179 |
| Nonanal | 0.0813 | 0.7967 |
| Linalool | 0.3432 | 3.3428 |
| Octanol | 0.0397 | 0.3950 |
| gamma-Terpinene | 0.0920 | 0.9044 |
| Limonene | 77.5689 | 773.3619 |
| Octanal | 0.4156 | 4.1061 |
| Myrcene | 1.2997 | 12.2302 |
| alpha-Pinene | 0.4243 | 4.1539 |
| Ethyl butyrate | 0.1791 | 1.7892 |
| Hexanal | 0.0399 | 0.3946 |
| 4-Terpineol | 0.1015 | 0.9805 |

An internal standard solution is prepared by adding 10 microl. of propyl benzene to 40 ml of ethyl acetate. For calibration, 200 microl. of the calibration standard mixture is spiked into orange juice concentrate stripped of its volatile components. This calibration sample is diluted to 11.8° Brix before use.

The analytical procedure is as follows: weight 30 g of orange juice (11.8°0 Brix) into a 100 ml mass cylinder. The internal standard solution (50 microl.), methylene chloride (8 ml) and saturated salt solution (3 ml) are added to the orange juice sample. The sample is then homogenized for 30 seconds. The homogenized sample is transferred to a centrifuge tube and centrifuged at 10,000 rpms at 5° C. for 30 minutes. The bottom solvent layer is transferred to a 5 ml vial and evaporated to a small volume under nitrogen.

A Hewlett-Packard 5880A gas chromatograph equipped with a capillary column injector is used in the analysis. A Hewlett-Packard 3357 minicomputer with basic program is used to obtain data from the gas chromatograph. The following conditions are used:

| | |
| --- | --- |
| Air flow rate | 300 ml./min. |
| Hydrogen flow rate | 30 ml./min. |
| Nitrogen flow rate | 30 ml./min. (make up gas) |
| Helium flow rate | 3 ml./min. (carrier gas) (20 psi setting) |
| Split flow | 20 ml./min. |
| Septum purge flow | 2–3 ml./min. |

A DX-4 fused silica capillary column (0.32 mm. × 60 m., J&W Scientific) is used for analysis.

The oven is heated at 50° C. for 5 minutes and then programmed to rise 2° C./min. to a temperature of 120° C. The oven temperature then rises at 1.5° C./min. to a temperature of 160° C., then rises 8° C./min. to a temperature of 210° C., then rises at 3° C./min. to a temperature of 240° C., and is then held at 240° C. for 10 minutes.

The methylene chloride extract of the calibration sample is injected into the gas chromatograph to establish the retention time and response factor for each component. The response factor of the calibration extract is correct for any residual levels present in the stripped orange juice concentrate, as previously determined. The identity of each compound in the chromatogram is confirmed using retention time data of a known standard, as determined by a Finnigan MAT 4500 GC mass spectrometer.

A Hewlett-Packard 3357 minicomputer is used to obtain data from the gas chromatograph. The amount of each compound in the juice sample (mg./ml. or ppb) is calculated as follows:

$$\left( \frac{\text{Peak Area of Compound}}{\text{Peak Area of Internal Standard}} \right) \times \left( \frac{\text{Response Factor of Compound}}{\text{Response Factor of Internal Standard}} \right) \times$$

(Amount of Internal Standard)

c. Flavanoid glycoside analysis

A stock solution containing 240 mg. of hesperidin per 100 ml. is prepared by dissolving 300 mg. of 80% pure hesperidin in a 100 ml. volumetric flask containing 80 ml. of 0.1N NaOH, adjusting the pH to 7.0 with glacial acetic acid, and then diluting to volume with distilled water.

From this stock solution, standard solutions containing 40, 80, 120 and 180 mg. of hesperidin per 100 ml. are also prepared.

The stock solution and the 4 standard solutions are used to obtain a standard spectrophoto metric curve as follows:

For each solution, 3 test tubes are used (15 in all). Into each test tube is pipetted 5 ml. of diethyleneglycol (90% concentration) and 0.1 ml. of the standard solution. After each test tube is mixed well with a Vortex mixer, 0.1 ml. of 4N NaOH is added to the second and third test tubes, followed by mixing with a Vortex mixer. The test tubes are allowed to stand for 45 minutes for full development of yellow color before spectrophotometric measurements are taken. The first test tube containing only standard solution and diethyleneglycol is used to zero the spectrophotometer (Bausch & Lomb Spec. 21) at 420 nanom. for the second and third test tubes. The readings for the second and third test tubes are averaged to obtain the absorbency value for each standard solution. The absorbency values for the stock and standard solutions are plotted to provide a standard curve from which absorbency values can be converted into mg. of hesperidin per 100 ml.

Juice samples analyzed from flavanoid glycosides should be free of sensible pulp, i.e. pulp which does not pass through a 20 mesh screen. The absorbency value from each juice sample is determined by the same procedure used to determine absorbency values for the stock and standard solution. The absorbency value for the juice sample is then compared with the standard curve to determine the mg. of hesperidin in the sample per 100 ml.

d. Viscosity

Into the sample cup of UL-adaptor is poured 16 ml. of a viscosity standard (known viscosity of 5 to 10 centipoise). A Brookfield LVTD rotational viscometer is set up with the UL-adaptor being placed in a 25° C. water bath. The viscosity standard in the sample cup is allowed to equilibrate in the waterbath for 10 minutes before a reading is taken at 12 rpm. The known viscosity of the viscosity standard is divided by the average dial reading at 12 rpm to determine the response factor.

Sensible pulp is removed from the juice sample (solids content of 11.8° Brix) by passing it through a 20 mesh screen. (For concentrate products, water is added to dilute the juice sample to 11.8° Brix prior to pulp removal.) Into the sample cup of the UL-adaptor is poured 16 ml. of the screened sample. The UL-adaptor of the viscometer is placed in an 8° C. water bath. The screened juice sample is allowed to equilibrate in the water bath for 15 minutes before a reading is taken at 12 rpm. The viscosity of the juice sample at 12 rpm is determined by multiplying the dial rain by the response factor.

e. Volume % of sinking pulp

The juice is stirred enough to obtain a uniform sample. Sensible pulp is removed from the sample by passing it through a 20 mesh screen. (For concentrate products, water is added to dilute the juice sample to 11.8° Brix prior to sensible pulp removal.) The screened sample is equilibrated to a temperature of 80±2° F. Two conical 50 ml. graduated tubes are then filled with exactly 50 ml. each of the well mixed, equilibrated sample. The tubes are placed in the centrifuge (IEC Model HN-SII, IEC Centrifuge Head #215, IEC Trunnion rings, #325, IEC Shields #320) so that the graduated scale faces the direction of rotation. With the load balanced, the samples are centrifuged at 1500 rpm for 10 minutes. The mls. of pulp at the bottom of each tube is read to the nearest ml. and then multiplied by 2 to get the volume % of sinking pulp. The values for the tubes are averaged to obtain the volume % of sinking pulp for sample.

f. Titratable peel oil content (Scott Oil Method)

This method is based on the Scott Oil Method described in Nagy et al, Citrus Science and Technology, Vol. 2 (1977), pp. 506–508. In this method, peel oil is distilled from an 2-propanol solution of the juice sample and then titrated with a standard $KBr\text{-}KBrO_3$ solution in an acidic medium.

A 0.025N $KBr\text{-}KBrO_3$ titrant solution is prepared by diluting 1 part of a 0.1N $KBr\text{-}KBrO_3$ solution (from RICCA Chemical Company, ARlington, Texas, CAtalog No. 1170), with 3 parts distilled water. An acidic indicator solution is also prepared by mixing together 5 ml. of a 0.1% methyl orange solution with 1000 ml. of a dilute hydrochloric acid solution (2 parts distilled $H_2O$, 1 part HCl).

A standard Scott Peel Oil Distillation Apparatus is used in this method. This apparatus essentially consists of a flat bottom distillation flask, an inclined adaptor and a distillation condenser.

A blank titration value (TB) is obtained by titrating 3 separate mixtures containing 25 ml. of 2-propanol and 10 ml. of the acidic indicator solution with the titrant solution and then dividing the to talc. of titrant solution used by 3.

For single-strength products and feed juices, 25 ml. of a well mixed juice sample is pipetted into the distillation flask containing boiling chips or beads, followed by the addition of 25 ml. of 2-propanol. The mixture in the distillation flask is then heated to a temperature of about 85° C. Distillate is collected until condensation of water vapor appears on the transfer tube (approximately 35 ml. of distillate). To the distillate is then added 10 ml. of the acidic indicator solution. While being stirred with a magnetic stirrer, the acidic distillate solution is titrated with titrant solution to a colorless end point. The volume of titrant solution required to reach the end point (TS) is recorded. The % titratable peel oil for the sample is then obtained by the following calculation:

% titratable peel oil $=(TS-TB)\times 0.004$

For concentrate products, water is added until the sample is diluted to 11.8° Brix. The titratable peel oil content of this diluted sample is then determined by the same method used for single strength products and feed juices.

2. Aqueous stripper essence a. Capillary column gas chromatographic analysis of volatiles other than ethanol, methanol and acetaldehyde.

A standard mixture solution is prepared by adding absolute ethanol (10 ml.) to a 50 ml. volumetric flask, followed by various compounds present in orange juice in the amounts indicated below:

| COMPOUND | Amount microl. | PPM (w/v) |
| --- | --- | --- |
| n-Propanol | 40 | 3.21 |
| Diacetyl | 60 | 5.79 |
| Ethyl acetate | 150 | 13.49 |
| Isobutanol | 40 | 3.20 |
| n-Butanol | 25 | 2.01 |
| 1-Penten-3-ol | 25 | 2.06 |
| Ethyl propionate | 40 | 3.56 |
| Methyl butyrate | 25 | 2.23 |
| Acetal | 150 | 12.42 |
| Pentanol | 40 | 3.25 |
| Hexanal | 40 | 3.22 |
| Ethyl butyrate | 150 | 13.16 |
| trans-2-Hexenal | 40 | 3.32 |
| cis-3-Hexenol | 40 | 3.34 |
| Hexanol | 40 | 3.23 |

-continued

| COMPOUND | Amount microl. | PPM (w/v) |
| --- | --- | --- |
| Heptanal | 40 | 3.00 |
| Octanal | 40 | 3.24 |
| Limonene | 40 | 3.35 |
| Octanol | 40 | 3.29 |
| Linalool | 80 | 6.78 |
| Ethyl-3-hydroxyhexanoate | 40 | 3.84 |
| Terpinene-4-ol | 30 | 2.67 |
| alpha-Terpineol | 40 | 3.70 |
| Decanal | 25 | 1.93 |
| Neral | 40 | 1.12 |
| d-Carvone | 20 | 1.89 |
| Geraniol | 30 | 2.51 |
| Geranial | 40 | 2.12 |
| Thymol | 41 | 4.10 |
| Valencene | 40 | 2.69 |
| Nootkatone | 30 | 2.52 |

After all of the above compounds are added to the flask, the standard mixture solution is diluted to volume with ethanol.

An internal standard solution is also prepared by adding a small volume (2-3 ml.) of distilled water to a 10 ml. volumetric flask. Cyclohexanone (25 microl.) is added and the water/cyclohexanone internal standard solution is diluted to volume with distilled water.

A calibration solution is prepared by pipetting 4 ml. of a 15% ethanol solution into a 2 dram vial which is then spiked with 20 microl. of the internal standard solution and 20 microl. of the standard mixture solution.

A sample solution is prepared by first rinsing the pipette with a portion of the sample twice, pipetting 4 ml. of the sample into a 2 dram vial and then spiking the vial with 20 microl. of the internal standard solution.

A Hewlett-Packard 5880A Gas Chromatograph equipped with a capillary column injector is used in the analysis. A Hewlett-Packard 3357 minicomputer with basic program is used to obtain data from the gas chromatograph. The following condition are used:

| Air flow rate | 250 ml./min. |
| --- | --- |
| Hydrogen flow rate | 30 ml./min. |
| Nitrogen flow rate | 30 ml./min. (make up gas) |
| Helium flow rate | 2 ml./min. (carrier gas) (9.5 psi setting) |
| Split flow | 10 ml./min. |
| Septum purge flow | 3 ml./min. |

A DB-1 fused silica capillary column (032 mm. × 30 m., J&W Scientific) is used with the gas chromatograph.

The oven is heated at 40° C. for 7 minutes and then programmed to rise 3.0° C./min. to a temperature of 80° C. The oven temperature then rises at 5° C./min. to a final temperature of 240° C., and is then held at 240° C. for 5 minutes.

A 1 microl. portion of the calibration solution is injected into the gas chromatograph to establish the retention time and response factor for the various compounds present. A 1 microl. portion of the sample solution is injected into the gas chromatograph and then compared against eh calibration solution gas chromatograph to identify the various compounds. The amount of each compound in the sample solution (mg./ml. or ppm) is calculated as follows:

$$\left( \frac{\text{Peak Area of Compound}}{\text{Peak Area of Internal Standard}} \right) \times \left( \frac{\text{Response Factor of Compound}}{\text{Response Factor of Internal Standard}} \right) \times$$

(Amount of Internal Standard)

b. Packed column gas chromatographic analysis of ethanol, methanol and acetaldehyde.

An internal standard solution is prepared by adding n-propanol (0.2 ml.) to a 250 ml. volumetric flask, and then diluting to volume with distilled water.

An acetaldehyde stock solution is also prepared by adding 5 ml. of distilled water to a 25 ml. volumetric flask. Acetaldehyde (1 ml.) is added an the acetaldehyde stock solution is diluted to volume with distilled water.

A calibration solution is prepared by adding 300 ml. of distilled water to a 500 ml. volumetric flask, followed by 10 ml. of ethanol, 1 ml. of methanol and 8 ml. of the stock acetaldehyde solution. This calibration solution is diluted to volume with distilled water.

A calibration sample is prepared by pipetting 1 ml. of the calibration solution and 1 ml. of the internal standard solution into a 1 dram vial.

A sample solution is prepared by pipetting 1 ml. of the sample and 1 ml. of the internal standard solution into a 1 dram vial.

A Hewlett-Packard 5890 Gas Chromatograph equipped with a flame ionization detector is used in the analysis. A Hewlett-Packard 3390A integrator is used to obtain data from the gas chromatograph. The following conditions are used:

| Air flow rate | 38 psi |
| --- | --- |
| Hydrogen flow rate | 12 psi |
| Nitrogen flow rate | 25 ml./min. |

A Carbopack B/5% 80/120 mesh packed column (2 mm. × 6 ft.) is used with the gas chromatograph.

The oven is heated to 808° C. for 2 minutes and then programmed to rise 8.0° C./min. to a temperature of 120° C. The injector temperature is 150° C. while the detector temperature is 200° C.

A 1 microl. portion of the calibration sample is injected into the gas chromatograph to establish the retention time and response factor for ethanol, methanol and acetaldehyde. A 1 microl. portion of the sample solution is injected into the gas chromatograph and then compared against the calibration sample gas chromatograph to identify the various compounds. The amount of each compound in the sample solution (mg./ml. or ppm) is calculated as follows:

$$\left( \frac{\text{Peak Area of Compound}}{\text{Peak Area of Internal Standard}} \right) \times \left( \frac{\text{Response Factor of Compound}}{\text{Response Factor of Internal Standard}} \right) \times$$

(Amount of Internal Standard)

3. Capillary column gas chromatographic analysis of stripper oil volatiles.

A standard mixture is prepared by adding the following compounds present in orange oils in the amounts indicated below to a flask:

| Compound | Amount microl. | mg./ml. |
| --- | --- | --- |
| Acetaldehyde | 50 | 0.4339 |
| Methanol | 70 | 0.6193 |
| Ethanol | 100 | 0.8841 |
| Hexanal | 30 | 0.2705 |
| Ethyl butyrate | 50 | 0.4915 |
| trans-2-Hexanal | 40 | 0.3721 |
| cis-3-Hexenol | 30 | 0.2803 |
| Hexanol | 30 | 0.2709 |
| alpha-Pinene | 400 | 3.7643 |
| beta-Pinene | 30 | 0.2876 |
| Myrcene | 1300 | 10.9795 |
| Octanal | 300 | 2.7260 |
| Limonene | 85000 | 798.3886 |
| gamma-Terpinene | 70 | 0.6246 |
| Octanol | 130 | 1.1982 |
| Linalool | 200 | 1.8983 |
| Nonanal | 70 | 0.6350 |
| Citronellal | 70 | 0.6245 |
| Terpinene-4-oL | 70 | 0.6968 |
| alpha-Terpineol | 70 | 0.7252 |
| Decanal | 400 | 3.4510 |
| Neral (citral) | 70 | 0.2195 |
| d-Carvone | 20 | 0.2120 |
| Geraniol | 20 | 0.1877 |
| Geranial (citral) | 70 | 0.4146 |
| Perillaldehyde | 40 | 0.3536 |
| Dodecanal | 48.6 | 0.3505 |
| Caryophellene | 30 | 0.2726 |
| Valencene | 400 | 3.0147 |
| Nootkatone | 70 | 0.6582 |

An internal standard solution is also prepared by adding a small volume (10–20 ml.) of ethyl acetate to a 100 ml. volumetric flask. Propyl benzene (300 microl.) is added and then the internal standard solution is diluted to volume with ethyl acetate.

A calibration solution is prepared by adding 1 ml. of the standard mixture solution and 1 ml. of the internal standard solution to a 1 dram vial.

A sample solution is prepared by first rinsing the pipette with a portion of the sample twice, and then pipetting 1 ml. of the sample and 1 ml. of the internal standard solution into a 1 dram vial.

A Hewlett-Package 5880A Gas Chromatograph equipped with a capillary column injector is used in the analysis. A Hewlett-Packard 3357 minicomputer with basic program is used to obtain data from the gas chromatograph. The following conditions are used:

| | |
| --- | --- |
| Air flow rate | 250 ml./min. |
| Hydrogen flow rate | 30 ml./min. |
| Nitrogen flow rate | 30 ml./min. (make up gas) |
| Helium flow rate | 3 ml./min. (carrier gas) (20 psi setting) |
| Split flow | 150 ml./min. |
| Septum purge flow | 3 ml./min. |

A DX-4 fused silica capillary column (0.32 mm.×60 m., J&W Scientific) is used with the gas chromatograph.

The oven is heated at 55° C. for 5 minutes and then programmed to rise 2° C./min. to a temperature of 120° C. The oven temperature then rises at 1.5° C./min. to a temperature of 160° C., then at 4° C./min. to a final temperature of 220° C., and is then held at 220° C. for 10 minutes.

A 1 microl. portion of the calibration solution is injected into the gas chromatograph to establish the retention time and response factor for the various compounds present. A 1 microl. portion of the sample solution is injected into the gas chromatograph (using solvent plug technique) and then compared against the calibration solution gas chromatograph to identify the various compounds. The amount of each compound in the sample solution is calculated as follows:

$$\left( \frac{\text{Peak Area of Compound}}{\text{Peak Area of Internal Standard}} \right) \times \left( \frac{\text{Response Factor of Compound}}{\text{Response Factor of Internal Standard}} \right) \times$$

(Amount of Internal Standard)

4. Evaporative orange juice concentrate a. Viscosity

The viscosity of juice concentrate si determined by the same method as E(1)(d) for feed juices, but using a RVT Brookfield viscometer with a No. 6 or 7 spindle rotated at 100 rpm.

b. Pectinesterase ACtivity

This method determines the amount of activity of the enzyme pectin methylesterase (pectinesterase) in the juice of juice concentrate.

A 2M sodium chloride stock solution is prepared by placing 58.45 grams of sodium chloride in a 500 ml. volumetric flask, adding distilled water to the mark and then shaking until the sodium chloride is completely dissolved.

A 1% pectin/salt solution is prepared as follows: a 75 ml. portion of the 2M sodium chloride stock solution is placed in a 1 liter volumetric flask which is then diluted to the mark with distilled water. The blender jag (Waring blender) is then filled approximately ¾ full with this solution. Using a variable transformer, the blender is run at an approximately 40% setting. Pure citrus pectin (10±0.1 g.) is slowly sifted into the blender jar, followed by the remaining ¼ of the salt solution. This 1% pectin/salt solution is then blended for approximately 1 minute.

Pectinesterase activity in the sample is determined as follows: a 100 ml. portion of the 1% pectin/salt solution is placed in a 250 ml. beaker which is brought to a temperature of 35° C.±1° C. by using a water bath. A 10 ml. juice concentrate sample diluted to 11.8° Brix is then pipetted into the solution in the beaker. A magnetic stirrer is placed in the solution, followed by insertion of pH meter electrodes (Fisher Tritrimeter II Fep) and then the solution is stirred slowly. Enough 0.10N NaOH solution is added to raise the pH of the solution to just barely over 7.5, e.g. 7.6. When the pH of the solution lowers to exactly 7.5, 0.02N NaOH is added for 10 minutes at a rate that will hold the pH as near 7.5 as possible. The milliliters of 0.02N NaOH required during this 10 minute period are used in the following calculation to determine pectinesterase acidity (P.E. Unis) of the juice concentrate sample per °Brix:

P.E. Units per °Brix=[(milliliters of 0.02N NaOH)×0.02]/[(°Brix of Sample)×100]

What is claimed is:

1. An aqueous orange stripper essence, which comprises:

(a) from about 0.5 to about 8% ethanol;

(b) ethyl acetate, ethyl butyrate and acetaldehyde, in a combined amount of from about 100 to about 300 parts, per 10,000 parts ethanol;

(c) hexanal and alpha-terpineol in a combined amount of from about 1 to about 10 parts, per 10,000 parts ethanol;
(d) a ratio of component (b) to component (c) of from about 10:1 to about 300:1;
(e) a ratio of ethyl; butyrate to component (c) of from about 2:1 to about 5:1; and
(f) from about 92% to about 95.5% water wherein the aqueous orange stripper essence is producible by a process comprising the steps of:

(1) heating an orange fed juice stream to a temperature of from about 100° F. (37.7° C.) to about 160° F. (71° C.);
(2) stripping the heated feed juice with steam at a steam:soluble solids ratio of from about 0.3 to about 1.5, at a temperatures of from about 100° F. (37.7° C.) to about 160° F. (71° C.) and at a stripping column pressure of less than 9 inches of Hg, absolute;
(3) condensing the stripped volatiles at a temperature of from about 105° F. (40.6° C.) to about −320° F. (−196° C.); and
(4) centrifuging the condensate in a continuous stacked disk hermetic centrifuge to produce two clear phases;
(5) removing the aqueous orange stripper essence phase.

2. The essence of claim 1 which comprises from about 1 to about 3% ethanol.

3. The essence of claim 2 which comprises ethyl acetate, ethyl butyrate and acetaldehyde in a combined amount of from about 100 to about 200 parts, per 10,000 parts ethanol.

4. The essence of claim 3 which comprises hexanal and alpha-terpineol and combined amount of from about 1 to about 5 parts, per 10,000 parts ethanol.

5. The essence of claim 4 wherein said ratio of component (b) to component (c) is from about 35:1 to about 80:1.

6. The essence of claim 5 wherein the ratio of ethyl butyrate to hexanal is from about 3:1 to about 7:1.

7. An orange stripper oil, which comprises:
(a) from about 60 to about 95% limonene;
(b) from about 2 to about 10 parts valencene, per 100 parts limonene;
(c) alpha-pinene, myrcene, octanal, decanal and linalool in a combined amount of from about 1 to about 6 parts, per 100 parts limonene;
(d) a ratio of valence to component (c) of from about 0.5:1 to about 15:1; and
(e) a ratio of valencene to the combined amount of alpha-pinene and myrcene of from about 1:1 to about 6:1;

wherein the orange stripper oil is producible by a process comprising the steps of:

(1) heating an orange feed juice stream to a temperature of from about 100° F. (37.7° C.) to about 160° F. (71° C.);
(2) stripping the heated feed juice with steam at a steam-soluble solids ratio of from about 0.3 to bout 1.5, at a temperature of from about 100° F. (37.7° C.) to about 160° F. (71° C.) and a stripping column pressure of less than 9 inches of Hg, absolute;
(3) condensing the stripped volatiles at a temperature of from about 105° F. (40.6° C.) to about −320° F. (−196° C.);
(4) centrifuging the condensate in a continuous stacked disk hermetic centrifuge to produce two clear phases; and
(5) removing the orange stripper oil phase.

8. The oil of claim 7 which comprises from about 65 to about 85% limonene.

9. The oil of claim 8 wherein said ratio of valencene to component (c) is from about 0.5:1 to about 3:1.

10. The oil of claim 9 wherein said ratio of valencene to combined alpha-pinene and myrcene is from about 1:1 to about 4:1.

11. The oil of claim 9 wherein the ratio of valencene to the combined amount of octanal and decanal is from about 2:1 to about 10:1.

12. The oil of claim 11 wherein said ratio of valencene to combined octanal and decanal is from about 2:1 to about 5:1.

* * * * *

UNITED STATES PATENT AND TRADEMARK OFFICE
CERTIFICATE OF CORRECTION

PATENT NO. : 4,973,485

DATED : November 27, 1990

INVENTOR(S) : Thomas F. Rich

It is certified that error appears in the above-identified patent and that said Letters Patent is hereby corrected as shown below:

Column 53, line 6, which is line 12 of claim 1, "ethyl; butyrate" should read --ethyl butyrate--.

Column 53, line 11, which is line 17 of claim 1, "fed" should read --feed--.

Column 53, line 16, which is line 22 of claim 1, "temperatures" should read --temperature--.

line 2 of claim 4, "and" (2nd occurrence) should read -- in a --.

Signed and Sealed this

Fifth Day of January, 1993

*Attest:*

DOUGLAS B. COMER

*Attesting Officer*   Acting Commissioner of Patents and Trademarks